(12) United States Patent
Ozawa et al.

(10) Patent No.: US 7,507,282 B2
(45) Date of Patent: Mar. 24, 2009

(54) INK COMPOSITION AND INKJET RECORDING METHOD

(75) Inventors: Takashi Ozawa, Shizuoka (JP); Keiichi Tateishi, Kanagawa (JP); Toru Harada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 225 days.

(21) Appl. No.: 11/184,992

(22) Filed: Jul. 20, 2005

(65) Prior Publication Data

US 2006/0016368 A1 Jan. 26, 2006

(30) Foreign Application Priority Data

Jul. 20, 2004 (JP) .................. P. 2004-211241
May 24, 2005 (JP) .................. P. 2005-151254

(51) Int. Cl.
*C09D 11/00* (2006.01)
*C09D 11/02* (2006.01)
*B41J 2/01* (2006.01)

(52) U.S. Cl. .................. 106/31.48; 347/100

(58) Field of Classification Search .............. 106/31.27, 106/31.47, 31.48; 347/100
See application file for complete search history.

(56) References Cited

U.S. PATENT DOCUMENTS

| | | | | |
|---|---|---|---|---|
| 4,163,675 | A * | 8/1979 | Hirano et al. ............ 106/31.43 |
| 4,737,190 | A | 4/1988 | Shimada et al. | |
| 5,478,383 | A * | 12/1995 | Nagashima et al. ...... 106/31.43 |
| 6,231,653 | B1 | 5/2001 | Lavery et al. | |
| 6,238,442 | B1 | 5/2001 | Schumacher et al. | |
| 6,281,917 | B1 | 8/2001 | Katsuragi et al. | |
| 6,319,309 | B1 * | 11/2001 | Lavery et al. ............ 106/31.27 |
| 6,379,441 | B1 * | 4/2002 | Kanaya et al. .......... 106/31.49 |
| 6,878,196 | B2 * | 4/2005 | Harada et al. ........... 106/31.48 |
| 6,984,032 | B2 * | 1/2006 | Kitamura et al. .......... 347/100 |
| 7,214,260 | B2 * | 5/2007 | Doi et al. ................. 106/31.58 |
| 7,270,699 | B2 * | 9/2007 | Doi .......................... 106/31.27 |
| 7,296,885 | B2 * | 11/2007 | Doi .............................. 347/100 |
| 7,300,145 | B2 * | 11/2007 | Doi .............................. 347/100 |
| 2003/0213405 | A1 | 11/2003 | Harada et al. | |
| 2006/0055750 | A1 * | 3/2006 | Taguchi et al. ............. 347/100 |
| 2006/0233976 | A1 * | 10/2006 | Uhlir-Tsang et al. ..... 428/32.34 |
| 2006/0272544 | A1 * | 12/2006 | Chino et al. ............. 106/31.27 |
| 2006/0293410 | A1 * | 12/2006 | Tokita et al. ............... 523/160 |

FOREIGN PATENT DOCUMENTS

| | | |
|---|---|---|
| EP | 1 357 158 A1 | 4/2003 |
| EP | 1 380 623 A | 1/2004 |
| EP | 1 403 337 A | 3/2004 |
| EP | 1437388 A1 | 7/2004 |
| JP | 6-25575 A | 2/1994 |
| JP | 6-228476 A | 8/1994 |
| JP | 6-248212 A | 9/1994 |
| JP | 7-26178 A | 1/1995 |
| JP | 7-228810 A | 8/1995 |
| JP | 7-268261 A | 10/1995 |
| JP | 8-259865 A | 10/1996 |
| JP | 8-337745 A | 12/1996 |
| JP | 9-12946 A | 1/1997 |
| JP | 9-12949 A | 1/1997 |
| JP | 10-279858 A | 10/1998 |
| JP | 2004-149612 A | 5/2004 |
| JP | 2004-149613 A | 5/2004 |
| WO | WO 2004/018574 A | 3/2004 |
| WO | WO 2005/075573 A | 8/2005 |

\* cited by examiner

*Primary Examiner*—Helene Klemanski
(74) *Attorney, Agent, or Firm*—Sughrue Mion, PLLC

(57) ABSTRACT

A novel ink composition, which has an absorption characteristic excellent in color reproducibility as a yellow color of one of the three primary colors, which has enough fastness against light, heat and humidity, and which does not cause bronze phenomenon, is provided. The ink composition contains water, a yellow dye having an oxidation potential nobler than 1.0 V, and an aromatic compound, aliphatic compound and/or a salt thereof having at least one of carboxyl group, sulfo group and phosphoric acid group.

13 Claims, No Drawings

INK COMPOSITION AND INKJET RECORDING METHOD

FIELD OF THE INVENTION

The present invention relates to an ink composition excellent in avoiding bronze phenomenon, particularly to an inkjet recording method excellent in avoiding bronze phenomenon and a method for avoiding bronze phenomenon of an image formed by an inkjet recording method.

BACKGROUND OF THE INVENTION

An inkjet recording method has been rapidly spread and is still developing because it requires inexpensive materials, it enables one to conduct rapid recording, it generates less noise upon recording, and because it permits color recording with ease. The inkjet recording method includes a method of continuous type wherein liquid droplets are continuously ejected and a method of on-demand type wherein liquid droplets are ejected in response to image information signals. Also, the ejection method includes a method of ejecting liquid droplets by applying pressure through piezo elements, a method of ejecting liquid droplets by generating a bubble in an ink through heat, a method of using ultrasonic waves and a method of attracting and ejecting liquid droplets by electrostatic power. As an ink for these inkjet recording methods, there are used aqueous inks, oily inks or solid (melting type) inks.

Colorants to be used in these inks for the inkjet recording method are required to have a high solubility in a solvent such as water, realize high-density recording, provide a good hue, have excellent fastness against light, heat, active gases in the environment (e.g., oxidative gases such as $NO_x$ and ozone, and $SO_x$), water and chemicals, show an enough good fixability for an image-receiving material not to be blurred, have an excellent keeping quality as an ink, have no toxicity, have a high purity and be available at a low price.

In particular, it has eagerly been required for dyes to have excellent fastness against light, humidity, heat and, particularly in the case of printing on an image-receiving material having an ink receptive layer containing porous, white inorganic pigment particles, oxidative gases in the environment such as ozone, and have an excellent water resistance.

On the other hand, it has been known that, in the case of forming a recorded image having a high optical density, dye crystals precipitate on the surface of the recording material as the recording material is dried and, as a result, the recorded image reflects light to give metallic luster, which is called the problem of bronze phenomenon. This phenomenon tends to take place when solubility of the dye in water is reduced or when a hydrogen bond-forming group is introduced into the structure of the dye for the purpose of improving resistance to water, light or gas. Since the bronze phenomenon causes reflection or scattering of light, the recorded image suffers not only reduction of optical density but also serious change in hue from desired hue and loss of transparency. Thus, depression of the bronze phenomenon is one of important factors required for the ink for use in inkjet recording.

As methods for depressing the bronze phenomenon, there have so far been known a method of adding a specific, nitrogen-containing compound (see, for example, JP-A-6-25575, JP-A-6-228476, JP-A-6-248212, JP-A-7-228810, JP-A-7-268261, JP-A-9-12946 and JP-A-9-12949), a method of adding a specific, hetero ring compound (see, for example, JP-A-8-259865, JP-A-2004-149612 and JP-A-2004-149613), a method of adding a specific titanium-containing compound (see, for example, JP-A-8-337745), and a method of adding an alkali metal ion (see, for example, JP-A-7-26178). However, although the bronze phenomenon can be depressed by adding these additives, the amounts thereof tend to become large due to their insufficient effects, or there arises a problem with respect to storage stability. Thus, the methods can deteriorate various performances of the ink and the quality of recorded images. For example, in the case of adding an alkanolamine to the ink, pH of the ink becomes as high as 11 or more even when it is added in only a small amount. It is described in JP-A-8-259865 that an ink having such a high pH adversely affects the nozzle and, in addition, lacks safety in the case when it is accidentally touched by a human body, and reduces quality of printed letters and resistance to water of recorded images.

Although various effects can be obtained by using the additives, it has been difficult to use the additives of the related art with maintaining various performances. In particular, in the case where it is necessary to take solubility and association of a dye into consideration, it can be seen that selection of kind and amount of the additive are difficult. Also, in the case of using an ionic additive, influences of the counter ion thereof must be taken into consideration as well. Therefore, it has been desired to introduce a method of essentially depressing the bronze phenomenon by designing a molecule of the additive based on a novel idea.

Further, as a method for depressing bronze phenomenon caused by a cyan dye or the like, there has been known a method of using a compound having a carboxyl group (EP-A-1357158). However, the compounds serve to depress bronze phenomenon with respect to dyes of a comparatively longer wavelength such as cyan dyes and, as to bronze phenomenon caused by the yellow dye, nothing is described therein.

SUMMARY OF THE INVENTION

Objects of an illustrative, non-limiting embodiment of the invention are:
(1) to provide a novel ink composition which has an bsorption characteristic excellent in reproducing a yellow color as one of the three primary colors and a sufficient fastness against light, heat, humidity and active gases in the environment and which does not cause bronze phenomenon;
(2) to provide an ink composition for use in inkjet recording and an inkjet recording method which can form, by using particularly a yellow azo dye, an image having a good hue, a high fastness against light and active gases in the environment, particularly, an ozone gas, having an excellent water resistance and not causing the bronze phenomenon; and
(3) to provide a method of providing an image-recorded product not suffering bronze phenomenon and a method of preventing the bronze phenomenon, by utilizing the above-mentioned inkjet recording method.

The above-described object of the invention can be accomplished by the following constitutions.
(1) An ink composition containing: water; a yellow dye having an oxidation potential nobler than 1.0 V; and at least one compound of an aromatic compound (an aromatic compound having either a hetero ring or a hydrocarbon ring), an aliphatic compound and a salt thereof, the at least one compound having at least one of a carboxyl group, a sulfo group and a phosphoric acid group. The at least one compound is sometimes referred to as "acid group-containing compound".
(2) The ink composition as described in (1), wherein the acid group-containing compound is at least one of an aromatic compound and a salt thereof.
(3) The ink composition as described in (1) or (2), wherein the acid group-containing compound has a carboxyl group.

(4) The ink composition as described in any one of (1) to (3), wherein the acid group-containing compound is at least one of pyridine-2-carboxylic acid, pyridine-3-carboxylic acid, pyridine-4-carboxylic acid and a salt thereof.
(5) The ink composition as described in any one of (1) to (4), wherein the acid group-containing compound is at least one of pyridine-2-carboxylic acid and a salt thereof.
(6) The ink composition as described in any one of (1) to (5), wherein the yellow dye is a compound represented by formula (1):

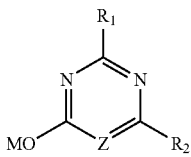

wherein $R_1$ and $R_2$ each represents a monovalent group, Z represents a nitrogen atom, an oxygen atom, a sulfur atom or a carbon atom to which a monovalent group is bound, and M represents a hydrogen atom or a cation, provided that two azo groups exist in the molecule.
(7) The ink composition as described in any one of (1) to (6), which has the acid group-containing compound in a content of from 0.1 to 6% by weight based on the total weight of the ink composition.
(8) The ink composition as described in any one of (1) to (7), which has a ratio by weight of the acid group-containing compound: the yellow dye of 0.1:1.0 to 6.0:1.0.
(9) The ink composition as described in any one of (1) to (8), which further contains an acetylene glycol-based surfactant.
(10) The ink composition as described in (9), which has the acetylene glycol-based surfactant in a content of from 0.1 to 5% by weight based on the total weight of the ink composition.
(11) The ink composition as described in any one of (1) to (10), which further contains a glycol ether-based penetration-accelerating agent.
(12) The ink composition as described in any one of (1) to (11), which further contains at least one of glycerin and triethylene glycol.
(13) The ink composition as described in any one of (1) to (12), which further contains urea.
(14) The ink composition as described in any one of (1) to (13), which further contains triethanolamine.
(15) The ink composition as described in any one of (1) to (14), which further contains an antiseptic.
(16) The ink composition as described in any one of (1) to (15), which has a pH of from 7 to 9.
(17) An ink set containing an ink composition described in any one of (1) to (16).
(18) An inkjet recording method including using an ink composition described in any one of (1) to (16) or an ink set described in (17).
(19) The inkjet recording method as described in (18), wherein an inkjet head forming an ink droplet by mechanical deformation of an electrostrictive strain element is used.
(20) The inkjet recording method as described in (18) or (19), which includes ejecting a liquid droplet of the ink composition to deposit the liquid droplet on a recording medium.
(21) An inkjet recorded product, which is recorded by employing the inkjet recording method described in any one of (18) to (20).
(22) A method for avoiding bronze phenomenon in inkjet recording using an ink composition containing a yellow dye, which includes using an aromatic compound, aliphatic compound and/or the salt thereof having at least one of carboxyl group, sulfo group and phosphoric acid group.

The invention provides an ink composition (preferably an ink composition for use in inkjet recording) which is excellent in color-reproducing properties and which can form a yellow image having enough fastness against light, heat, humidity and active gases in the environment and, further, an inkjet-recorded product and an inkjet recording method which prevent bronze phenomenon of an image, and a method for preventing the bronze phenomenon of an image.

DETAILED DESCRIPTION OF THE INVENTION

Exemplary embodiments of the invention will be described in detail below.

(Yellow Dyes)
Yellow dyes useful for the invention are described in detail below.

As the yellow dye to be used in the invention, dyes having an oxidation potential nobler than 1.0 V (vs SCE) are preferred, dyes having an oxidation potential nobler than 1.1 V (vs SCE) are more preferred, and dyes having an oxidation potential nobler than 1.2 V (vs SCE) are particularly preferred, in view of fastness against light, heat and an ozone gas.

The oxidation potential ($E_{ox}$) can easily be measured by those skilled in the art. This method is described in, for example, *New Instrumental Methods in Electrochemistry*, written by Delahay (published by Interscience Publishers Co. in 1954), *Electrochemical Methods*, written by J. Bard, et al. (published by John Wiley & Sons Co. in 1980), and *Denki Kagaku Sokuteiho*, written by Akira Fujishima, et al. (published by Gihodo Shuppansha in 1984).

Specifically, the oxidation potential is measured in terms of the value versus SCE (saturated calomel electrode) by dissolving a test sample in a solvent such as dimethylformamide or acetonitrile containing a supporting electrolyte such as sodium perchlorate or tetrapropylammonium perchlorate in a concentration of from $1\times10^{-2}$ to $1\times10^{-6}$ mol/L (liter) and employing various voltammetry methods (polarography using a dropping mercury electrode, cyclic voltammetry and a method of using a rotating disc electrode). In some cases, the thus-obtained values deviate by about several ten mV due to the influence of liquid potential difference or liquid resistance of the sample solution. However, reproducibility of the potential can be ensured by using a standard sample (such as hydroquinone).

Additionally, in the invention, in order to unambiguously specify the potential, a value (vs SCE) measured in N,N-dimethylformamide containing a supporting electrolyte of tetrapropylammonium perchlorate in a concentration of 0.1 mol·dm$^{-3}$ (dye concentration: $10^{-3}$ mol/L) using SCE (saturated calomel electrode) as a reference electrode, a graphite electrode as a working electrode and a platinum electrode as an opposite electrode is taken as the oxidation potential of a dye.

The value of $E_{ox}$ represents easiness with which an electron moves from a sample to an electrode, and a larger value (oxidation potential being nobler) represents that an electron moves from a sample to an electrode with less easiness or, in other words, that the sample is difficult to oxidize. As to relation with structure of a compound, oxidation potential of the compound is made nobler by introducing an electron attractive group, whereas oxidation potential thereof is made less noble. In the invention, in order to reduce reactivity with ozone which functions as an electrophilic agent, it is desirable to introduce an electron attractive group into a yellow dye skeleton to make nobler the oxidation potential of the dye.

Also, it is preferred for the dyes to be used in the invention to have a good fastness and a good hue. In the case of using in a yellow-colored ink composition (yellow ink), it is particularly preferred for the dye to have a sharp reduction of absorption on the longer wavelength side in the absorption spectrum. Thus, yellow dyes having $\lambda_{max}$ in the range of from 390 nm to 470 nm and the ratio of the absorbance at $\lambda_{max}+70$ nm, or I($\lambda_{max}+70$ nm), to the absorbance at $\lambda_{max}$, or I($\lambda_{max}$), i.e., I($\lambda_{max}+70$ nm)/I($\lambda_{max}$) is 0.20 or less than that are preferred, with the ratio being more preferably 0.15 or less, still more preferably 0.10 or less. Additionally, the absorption wavelength and the absorbance used in the above definition are the values in a solvent (water or ethyl acetate).

Dyes to be more preferably used in the invention are those yellow azo dyes which are represented by the foregoing formula (1).

Detailed descriptions on the formula (1) are given below.

$R_1$, $R_2$ and a monovalent group represented by Z are the same as the substituents for the aryl group to be described hereinafter.

The aforesaid dyes have two azo groups within the molecule, and have preferably (1) one group within the molecule which group has two azo group as substituents or (2) two groups each having one azo group. The group having two azo groups and the group having one azo group are preferably hetero ring groups. Examples of the hetero ring which constitutes the hetero ring group include a 5-pyrazolone ring, a 5-aminopyrazole ring, an oxazolone ring, a barbituric acid ring, a pyridone ring, a rhodanine ring, a pyrazolidinedione ring, a pyrazolopyridone ring and a merdramic acid ring. Of these, a 5-pyrazolone ring and a 5-aminopyrazole ring are preferred, with a 5-aminopyrazole being particularly preferred.

In the invention, M represents a hydrogen atom or a cation. Examples of the cation represented by M include an alkali metal ion and an ammonium or quaternary ammonium ion, with Li, Na, K, NH$_4$ and NR$_4$ being preferred (wherein R represents an alkyl group or an aryl group and is the same as the alkyl group or the aryl group to be described hereinafter).

Of the azo dyes represented by formula (1), those dyes are preferred which are represented by formulae (2), (3) and (4).

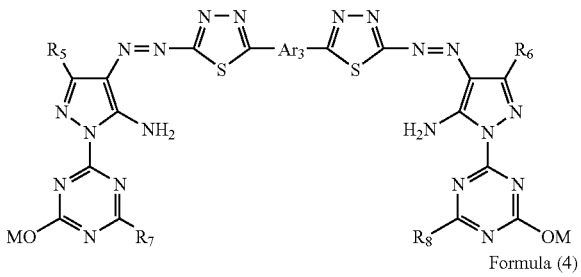

The monovalent groups represented by $R_3$ and $R_4$, respectively, in formula (2) are the same as the substituents for the aryl group to be described hereinafter. Further, preferred examples thereof include an alkyl group, a cycloalkyl group, an aralkyl group, an alkoxy group, an aryl group, an amino group, a carboxyl group (or the salt thereof) and a carbamoyl group, with an alkyl group (preferably a lower alkyl group having from 1 to 5 carbon atoms, such as methyl, ethyl, butyl or t-butyl) being more preferred. Detailed descriptions on these substituents are the same as that for the substituents to be described hereinafter.

As a hetero ring of a hetero ring group represented by Ar$_1$ or Ar$_2$, a 5-membered or 6-membered ring is preferred, which may further be condensed with other ring. Also, the hetero ring may be an aromatic hetero ring or a non-aromatic hetero ring. Examples thereof include pyridine, pyrazine, pyridazime, quinole, kisoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. Of these, aromatic hetero ring groups are preferred. To exemplify preferred examples thereof in the same manner as above, there are illustrated pyridinem pyrazine, pyridazine, pyrazole, imidazole, benzimidazole, triazole, benzoxazole, thiazole, benzothiazole, isothazole, benzisothiazole and thiadiazole. More preferred are imidazole, benzoxazole and thiadiazole, with thiadiazole (preferably 1,3,4-thiadiazole or 1,2,4-thiadiazole) being most preferred. These may have a substituent or substituents, and examples of such substituents are the same as the substituents for an aryl group to be described hereinafter.

The aryl group represented by Ar$_1$ or Ar$_2$ includes substituted or unsubstituted aryl groups. As the substituted or unsubstituted aryl group, aryl groups having from 6 to 30 carbon atoms are preferred. Examples of the substituent for the aryl group include a halogen atom, an alkyl group, a cycloalkyl group, an aralkyl group, an alkenyl group, an alkynyl group, an aryl group, a hetero ring group, a cyano group, a hydroxyl group, a nitro group, a carboxyl group (including a salt form thereof), an alkoxy group, an aryloxy group, a silyloxy group, a hetero ring oxy group, an acyloxy group, a carbamoyloxy group, an alkoxycarbonyloxy group, an aryloxycarbonyloxy group, an amino group (including an anilino group), an acylamino group, an aminocarbonylamino group, an alkocycambonylamino group, an aryloxycarbonylamino group, a sulfamoylamino group, an alkyl- or aryl-sulfonylamino group, a mercapto group, an alkylthio group, an arylthio group, a hetero ring thio group, a sulfamoyl group, a sulfo group (including a salt form thereof), an alkyl- or aryl-sulfinyl group, an alkyl- or aryl-sulfonyl group, an acyl group, an aryloxycarbonyl group, an alkoxycarbonyl group, a carbamoyl group, an imido group, a phosphino group, a phosphinyl group, a phospinyloxy group, a phosphinylamino group and a silyl group.

As the aryl group represented by $Ar_1$ and $Ar_2$, substituted phenyl groups (the substituent being preferably a carboxyl group or a sulfo group) are more preferred.

Those dyes are preferred which are represented by the foregoing formula (2) wherein $Ar_1$ and $Ar_2$ are represented by formula (A).

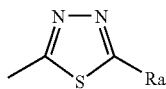

In formula (A), Ra represents a monovalent group. The monovalent group represented by Ra is the same as having been defined with respect to $R_1$ and $R_2$ in formula (1), and preferred scopes thereof are also the same as described there. More preferably, Ra represents -L-Ph or -Ph (wherein Ph represents a substituted or unsubstituted phenyl group, with the substituent being the same as the monovalent group represented by $R_1$ and $R_2$, and L represents a divalent linking group and is the same as $Ar_3$ in formula (3)). Still more preferably, Ra represents —S-Ph or -Ph (wherein Ph represents a substituted or unsubstituted phenyl group).

The substituents for the aryl group are described in more detail below.

The halogen atom includes a chlorine atom, a bromine atom and an iodine atom.

The alkyl group includes a substituted alkyl group and an unsubstituted group. The substituted or unsubstituted alkyl group contains preferably from 1 to 30 carbon atoms. Examples of the substituent include the same ones as those for the aryl group. Among them, a hydroxyl group, an alkoxy group, a cyano group, a halogen atom, a sulfo group (including a salt form thereof) and a carboxyl group (including a salt form thereof) are preferred. Examples of the alkyl group include methyl, ethyl, butyl, t-butyl, n-octyl, eicosyl, 2-chloroethyl, hydroxyethyl, cyanoethyl and 4-sulfobutyl.

The cycloalkyl group includes a substituted or unsubstituted cycloalkyl group. The substituted or unsubstituted cycloalkyl group is preferably a cycloalkyl group having from 5 to 30 carbon atoms. Examples of the substituent include the same one as the substituents for the aryl group. Examples of the cycloalkyl group include cyclohexyl, cyclopentyl and 4-n-dodecylcyclohexyl.

The aralkyl group includes a substituted or unsubstituted aralkyl group. The substituted or unsubstituted aralkyl group is preferably an aralkyl group having from 7 to 30 carbon atoms. Examples of the substituent include the same one as the substituents for the aryl group. Examples of the aralkyl group include benzyl and 2-phenethyl.

The alkenyl group includes a straight, branched or cyclic, substituted or unsubstituted alkenyl group. The alkenyl group is preferably a substituted or unsubstituted alkenyl group having from 2 to 30 carbon atoms, such as vinyl, allyl, prenyl, geranyl, oleyl, 2-cyclopenten-1-yl or 2-cyclohexen-1-yl.

The alkynyl group is a substituted or unsubstituted alkynyl group having from 2 to 30 carbon atoms, and examples thereof include ethynyl and propargyl.

The aryl group is a substituted or unsubstituted aryl group having from 6 to 30 carbon atoms, and examples thereof include phenyl, p-tolyl, naphthyl, m-chlorophenyl and o-hexadecanoylaminophenyl.

The hetero ring group is a monovalent group formed by removing one hydrogen atom from a 5- or 6-membered, substituted or unsubstituted, aromatic or non-aromatic hetero ring compound. More preferably, the hetero ring group is a 5- or 6-membered aromatic hetero ring group having from 3 to 30 carbon atoms. Examples thereof include 2-furyl, 2-thietnyl, 2-pyrimidinyl, 2-benzothiazolyl and morpholino.

The alkoxy group includes a substituted or unsubstituted alkoxy group. The substituted or unsubstituted alkoxy group is preferably an alkoxy group having from 1 to 30 carbon atoms. Examples of the substituent include the same one as the substituents for the aryl group. Examples of the alkoxy group include methoxy, ethoxy, isopropoxy, n-octyloxy, methoxyethoxy, hydroxyethoxy and 3-carboxypropoxy.

The aryloxy group is a substituted or unsubstituted aryloxy group containing from 6 to 30 carbon atoms, and examples thereof include phenoxy, 2-methylphenoxy, 4-t-butylphenoxy, 3-nitrophenoxy and 2-tetradecanoylaminophenoxy.

The silyloxy group is a silyloxy group containing from 3 to 30 carbon atoms, and examples thereof include trimethylsilyloxy and t-butyldimethylsilyloxy.

The hetero ring oxy group is a substituted or unsubstituted hetero ring oxy group containing from 2 to 30 carbon atoms, and examples thereof include 1-phenyltetrazol-5-oxy and 2-tetrahydropyranyloxy.

The acyloxy group is a substituted or unsubstituted alkylcarbonyloxy group containing from 2 to 30 carbon atoms or a substituted or unsubstituted arylcarbonyl group containing from 6 to 30 carbon atoms, and examples thereof include formyloxy, acetyloxy, pivaloyloxy, stearoyloxy, benzoyloxy and p-methoxyphenylcarbonyloxy.

The carbamoyloxy group is a substituted or unsubstituted carbamoyloxy group containing from 1 to 30 carbon atoms, and examples thereof include N,N-dimethylcarbamoyloxy, N,N-diethylcarbamoyloxy, morpholinocarbonyloxy, N,N-di-n-octylaminocarbonyloxy and N-n-octylcarbamoyloxy.

The alkoxycarbonyloxy group is a substituted or unsubstituted alkoxycarbonyloxy group containing from 2 to 30 carbon atoms, and examples thereof include methoxycarbonyloxy, ethoxycarbonyloxy, t-butoxycarbonyloxy and n-octylcarbonyloxy.

The aryloxycarbonyloxy group is a substituted or unsubstituted aryloxycarbonyloxy group containing from 7 to 30 carbon atoms, and examples thereof include phenoxycarbonyloxy, p-methoxyphenoxycarbonyloxy and p-n-hexadecyloxyphenoxycarbonyloxy.

The amino group is a substituted or unsubstituted alkylamino group containing from 1 to 30 carbon atoms or a substituted or unsubstituted arylamino group containing from 6 to 30 carbon atoms, and examples thereof include amino, methylamino, dimethylamino, aniline, N-methyl-anilino, diphenylamino, hydroxyethylamino, carboxyethylamino, sulfoethylamino and 3,5-dicarboxyanilino.

The acylamino group is a formylamino group, a substituted or unsubstituted alkylcarbonylamino group containing from 1 to 30 carbon atoms or a substituted or unsubstituted arylcarbonylamino group containing from 6 to 30 carbon atoms, and examples thereof include formylamino, acetylamino, pivaloylamino, lauroylamino, benzoylamino and 3,4,5-tri-n-octyloxyphenylcarbonylamino.

The aminocarbonylamino groupo is a substituted or unsubstituted aminocarbonylamino group containing from 1 to 30 carbon atoms, and examples thereof include carbamoylamino, N,N-dimethylaminocarbonylamino, N,N-diethylaminocarbonylamino and morpholinocarbonylamino.

The alkoxycarbonylamino group is a substituted or unsubstituted alkoxycarbonylamino group containing from 2 to 30 carbon atoms, and examples thereof include methoxycarbonylamino, ethoxycarbonylamino, t-butoxycarbonylamino, n-octadecyloxycarbonylamino and N-methyl-methoxycarbonylamino.

The aryloxycarbonylamino group is a substituted or unsubstituted aryloxycarbonylamino group containing from 7 to 30 carbon atoms, and examples thereof include phenoxycarbonylamino, p-chlorophenoxycarbonylamino and m-n-octyloxyphenoxycarbonylamino.

The sulfamoylamino group is a substituted or unsubstituted sulfamoylamino group containing from 0 to 30 carbon atoms, and examples thereof include sulfamoylamino, N,N-dimethylaminosulfonylamino and N-n-octylaminosulfonylamino.

The alkylsulfonylamino group and aryl-sulfonylamino group are a substituted or unsubstituted alkylsulfonylamino group containing from 1 to 30 carbon atoms and a substituted or unsubstituted arylsulfonylamino group containing from 6 to 30 carbon atoms, respectively, and examples thereof include methylsulfonylamino, butylsulfonylamino, phenylsulfonylamino, 2,3,5-trichlorophenylsulfonylamino and p-methylphenylsulfonylamino.

The alkylthio group is a substituted or unsubstituted alkylthio group containing from 1 to 30 carbon atoms, and examples thereof include methylthio, ethylthio and n-hexadecylthio.

The arylthio group is a substituted or unsubstituted arylthio group containing from 6 to 30 carfbon atoms, and examples thereof include phenylthio, p-chlorophenylthio and m-methoxyphenylthio.

The hetero ring thio group is a substituted or unsubstituted hetero ring thio group containing from 2 to 30 carbon atoms, and examples thereof include 2-benzothiazolylthio and 1-phenyltetrazol-5-ylthio.

The sulfamoyl group is a substituted or unsubstituted sulfamoyl group containing from 0 to 30 carbon atoms, and examples thereof include N-ethylsulfamoyl, N-(3-dodecyloxypropyl)sulfamoyl, N,N-dimethylsulfamoyl, N-acetylsulfamoyl, N-benzoylsulfamoyl and N-(N'-phenylcarbamoyl)sulfamoyl.

The alkylsulfinyl group and arylsulfinyl group are a substituted or unsubstituted alkylsulfinyl group containing from 1 to 30 carbon atoms and a substituted or unsubstituted arylsulfinyl group containing from 6 to 30 carbon atoms, respectively, and examples thereof include methylsulfinyl, ethylsulfinyl, phenylsulfinyl and p-methylphenylsulfinyl.

The alkylsulfonyl group and arylsulfonyl group are a substituted or unsubstituted alkylsulfonyl group containing from 1 to 30 carbon atoms and a substituted or unsubstituted arylsulfonyl group containing from 6 to 30 carbon atoms, respectively, and examples thereof include methylsulfonyl, ethylsulfonyl, phenylsulfonyl and p-methylphenylsulfonyl.

The acyl group is a formyl group, a substituted or unsubstituted alkylcarbonyl group containing from 2 to 30 carbon atoms, a substituted or unsubstituted arylcarbonyl group containing from 7 to 30 carbon atoms or a substituted or unsubstituted hetero ring carbonyl group containing from 4 to 30 carbon atoms and being connected through a carbonyl group, and examples thereof include acetyl, pivaloyl, 2-chloroacetyl, stearoyl, benzoyl, p-n-octyloxyphenylcarbonyl, 2-pyridylcarbonyl and 2-furylcarbonyl.

The aryloxycarbonyl group is a substituted or unsubstituted aryloxycarbonyl group containing from 7 to 30 carbon atoms, and examples thereof include phenoxycarbonyl, o-chlorophenoxycarbonyl, m-nitrophenoxycarbonyl and p-t-butylphenoxycarbonyl.

The alkoxycarbonyl group is a substituted or unsubstituted alkoxycarbonyl group containing from 2 to 30 carbon atoms, and examples thereof include methoxycarbonyl, ethoxycarbonyl, t-butoxycarbonyl and n-octadecylcarbonyl.

The carbamoyl group is a substituted or unsubstituted carbamoyl group containing from 1 to 30 carbon atoms, and examples thereof include carbamoyl, N-methylcarbamoyl, N,N-dimethylcarbamoyl, N,N-di-n-octylcarbamoyl and N-(methylsulfonyl)carbamoyl.

The phosphino group is a substituteds or unsubstituted phosphino group containing from 2 to 30 carbon atoms, and examples thereof include dimethylphosphino, diphenylphosphino and methylphenoxyphosphino.

The phosphinyl group is a substituted or unsubstituted phosphinyl group containing from 2 to 30 carbon atoms, and examples thereof include phosphinyl, dioctyloxyphosphinyl and diethoxyphosphinyl.

The phosphinyloxy group is a substituted or unsubstituted phosphinyloxy group containing from 2 to 30 carbon atoms, and examples thereof include diphenoxyphosphinyloxy and dioctyloxyphosphinyloxy.

The phosphinylamino group is a substituted or unsubstituted phosphinylamino group containing from 2 to 30 carbon atoms, and examples thereof include dimethoxyphosphinylamino and dimethylaminophosphinylamino.

The silyl group is a substituted or unsubstituted silyl group containing from 3 to 30 carbon atoms, and examples thereof include trimethylsinyl, t-butyldimethylsinyl and phenyldimethylsilyl.

Of the substituents of the above-described aryl group, those which have a hydrogen atom may further be substituted by replacing the hydrogen atom by the above-mentioned group. Examples of such functional group include an alkylcarbonylaminosulfonyl group, an arylcarbonylaminosulfonyl group, an alkylsulfonylaminocarbonyl group and an arylsulfonylaminocarbonyl group. Specific examples thereof include methylsulfonylaminocarbonyl, p-methylphenylsulfonylaminocarbonyl, acetylaminosulfonyl and benzoylaminosulfonyl.

Formula (3) is described in detail below. The monovalent group represented by $R_5$ and $R_6$ is the same as the monovalent group represented by $R_3$ and $R_4$ in formula (2). The monovalent group represented by $R_7$ and $R_8$ is the same as the aforesaid substituent for the aryl group. Further, each of $R_7$ and $R_8$ is preferably a halogen atom, OM (wherein M represents a hydrogen atom or cation), an alkoxy group, an alkylthio group, an arylthio group, an amino group or a hetero ring group. Substituents for these are the same as described hereinbefore.

The divalent linking group represented by $A_3$ is preferably an alkylene group (e.g., methylene, ethylene, propylene, butylenes or pentylene), an alkenylene group (e.g., ethenylene or propenylene), an alkynylene group (e.g., ethynylene or propynylene), an arylene group (e.g., phenylene or naphthylnene), a divalent hetero ring group (e.g., 6-chloro-1,3,5-triazin-2,4-diyl, pyrimidin-2,4-diyl, quinoxalin-2,3-diyl or pyridazin-3,6-diyl), —O—, —CO—, —NR— (wherein R represents a hydrogen atom, an alkyl group or an aryl group), —S—, —SO$_2$—, —SO— or a combination thereof (e.g., —NHCH$_2$CH$_2$NH— or —NHCONH—).

The alkylene group, alkenylene group, alkynylene group, arylene group, divalent hetero ring group, and alkyl or aryl group of R may have a substituent or substituents. Examples of the substituent are the same as the substituents for the aryl group. The alkyl and aryl groups of R are the same as defined hereinbefore.

More preferably, the linking group is an alkylene group containing 10 or less carbon atoms, an alkenylene group containing 10 or less carbon atoms, an alkynylene group containing 10 or less carbon atoms, an arylene group containing from 6 to 10 carbon atoms, —S—, —SO—, —SO$_2$— or a combination thereof (e.g., —SCH$_2$CH$_2$S— or —SCH$_2$CH$_2$CH$_2$S—).

The total number of carbon atoms of the divalent linking group is preferably from 0 to 50, more preferably from 0 to 30, most preferably from 0 to 10.

Formula (4) is described in detail below. The monovalent group represented by R$_9$ and R$_{10}$ is the same as the monovalent group represented by R$_3$ and R$_4$ in formula (2). The aryl group and the hetero ring group represented by Ar$_4$ and Ar$_5$ are the same as the aryl group and the hetero ring group represented by Ar$_1$ and Ar$_2$ of formula (2), with the hetero ring group being preferred. The divalent linking group represented by Ar$_6$ is the same as the divalent linking group of Ar$_3$ in formula (3).

In the invention, in the case where the compounds represented by formulae (1), (2), (3) and (4) are required to have hydrophilicity, it is preferred for the compounds to have two or more hydrophilic groups within the molecule, more preferably from 2 to 10 hydrophilic groups, particularly preferably from 3 to 6 carbon atoms. However, in the case where water is not used as a solvent, the compounds may not have the hydrophilic group.

As the hydrophilic group, any hydrophilic group may be used as long as it is an ionic dissociative group. Specific examples thereof include a sulfo group, a carboxyl group (including the salt thereof), a hydroxyl group (including the salt thereof), a phosphono group (including the salt thereof) and a quaternary ammonium group, with a sulfo group, a carboxyl group and a hydroxyl group (including the salt thereof) being preferred.

In view of color reproducibility, dyes represented by the foregoing formulae (1), (2), (3) and (4) have the maximum absorption wavelength ($\lambda$max) of from 380 to 490 nm in H$_2$O, preferably from 400 to 480 nm, particularly preferably from 420 to 460 nm.

Specific examples of the dyes represented by the foregoing formulae (1), (2), (3) and (4) (illustrative dyes 1 to 39) are shown below which, however, are not construed to limit the dyes of the invention in any way.

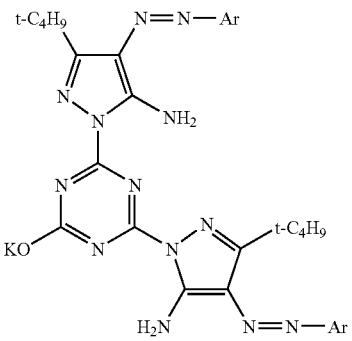

| Dye | Ar | Dye | Ar |
|---|---|---|---|
| 1 | N=N, S, S-Ar-COOK, COOK | 8 | N, S, N-SC$_2$H$_4$SO$_3$K |
| 2 | N=N, S, S-Ar(COOK)$_2$ | 9 | N, S, N-Ph |
| 3 | N=N, S, Ar-COOK | 10 | N, O-Ar-SO$_3$K |
| 4 | N=N, S, SC$_3$H$_6$COOK | 11 | N, N-CH$_2$COOK, (CN)$_2$ |

-continued

| # | Structure | # | Structure |
|---|---|---|---|
| 5 | 2-methyl-5-(SMe)-1,3,4-thiadiazole | 12 | 4-methylphenyl-SO₃K (p-tolyl sulfonate K) |
| 6 | 2-methyl-5-(SCH₂CHMe₂)-1,3,4-thiadiazole | 13 | 2-methyl-5-COOK-1,3,4-thiadiazole |
| 7 | 3-methyl-1,2,4-thiadiazole | | |

General structure for dyes 14–25:

t-C₄H₉—[pyrazole(NH₂, N-triazine(NaO, R))]—N=N—[thiadiazole]—Ar—[thiadiazole]—N=N—[pyrazole(NH₂, N-triazine(R, ONa))]—C₄H₉-t

| Dye | R | Ar |
|---|---|---|
| 14 | ONa | —SC₂H₄S— |
| 15 | ONa | —SC₃H₆S— |
| 16 | ONa | 4,5-bis(S—)-benzene-1,2-bis(COONa) |
| 17 | ONa | 1,2-bis(SCH₂—)benzene |
| 18 | ONa | 3,6-bis(S—)pyridazine |
| 19 | ONa | 4-Me-3-CN-2,6-bis(S—)pyridine |
| 20 | 3,5-bis(COONa)phenyl-NH— | —SC₂H₄S— |
| 21 | —NHC₂H₄SO₃Na | —SC₂H₄S— |
| 22 | —N(CH₂COONa)₂ | —SC₂H₄S— |
| 23 | —N(C₄H₉)₂ | —SC₂H₄S— |
| 24 | —NH₂ | —SC₂H₄S— |
| 25 | —SC₃H₆SO₃Na | —SC₂H₄S— |

-continued
| | | |
|---|---|---|
| 26 | —NHC$_2$H$_4$SO$_3$Na | 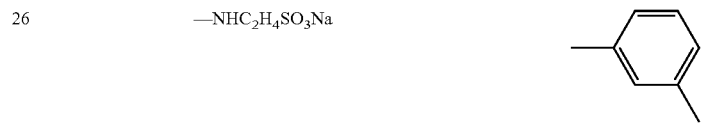 |
| 27 | —NHC$_2$H$_4$SO$_3$Na |  |
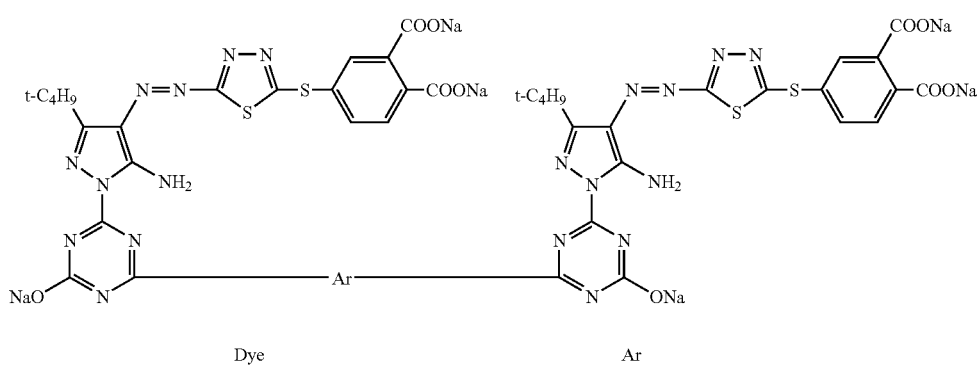
| Dye | Ar |
|---|---|
| 28 | 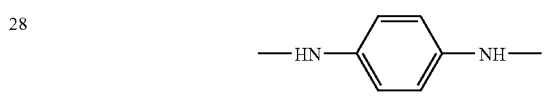 |
| 29 | 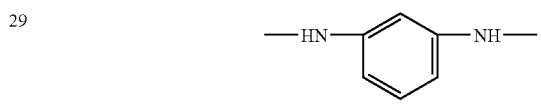 |
| 30 | 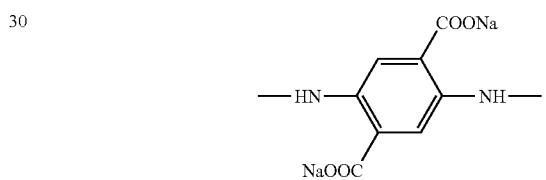 |
| 31 | 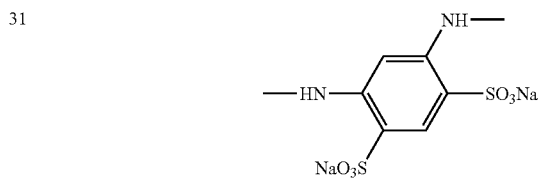 |
| 32 | 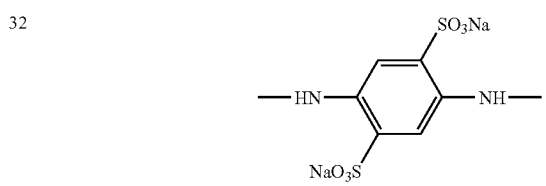 |
| 33 | —NHC$_2$H$_4$NH— |

-continued
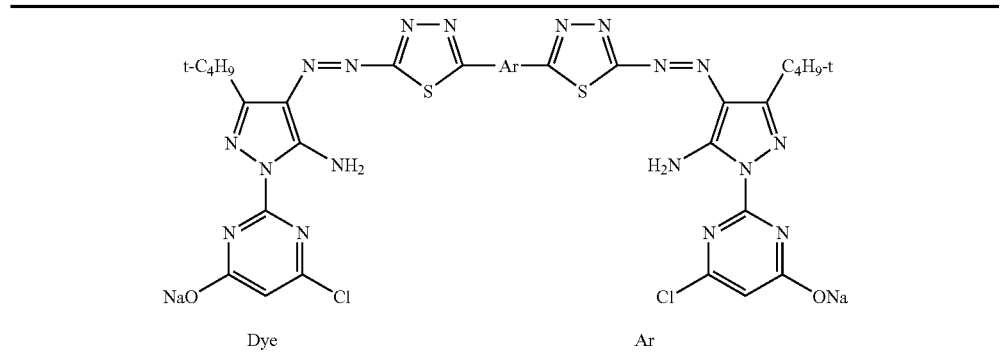
| Dye | Ar |
|---|---|
| 34 | —SC$_2$H$_4$S— |
| 35 | —SC$_3$H$_6$S— |
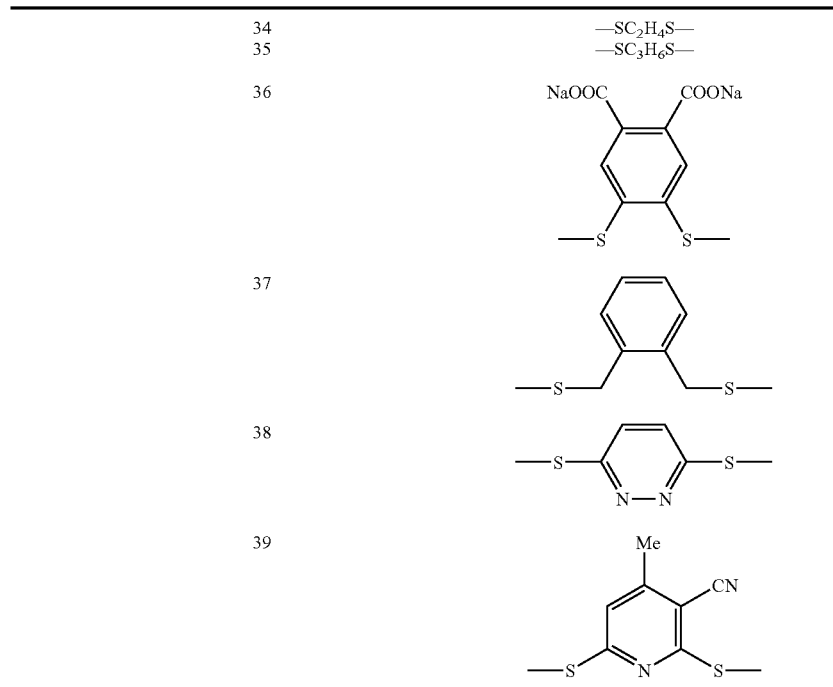
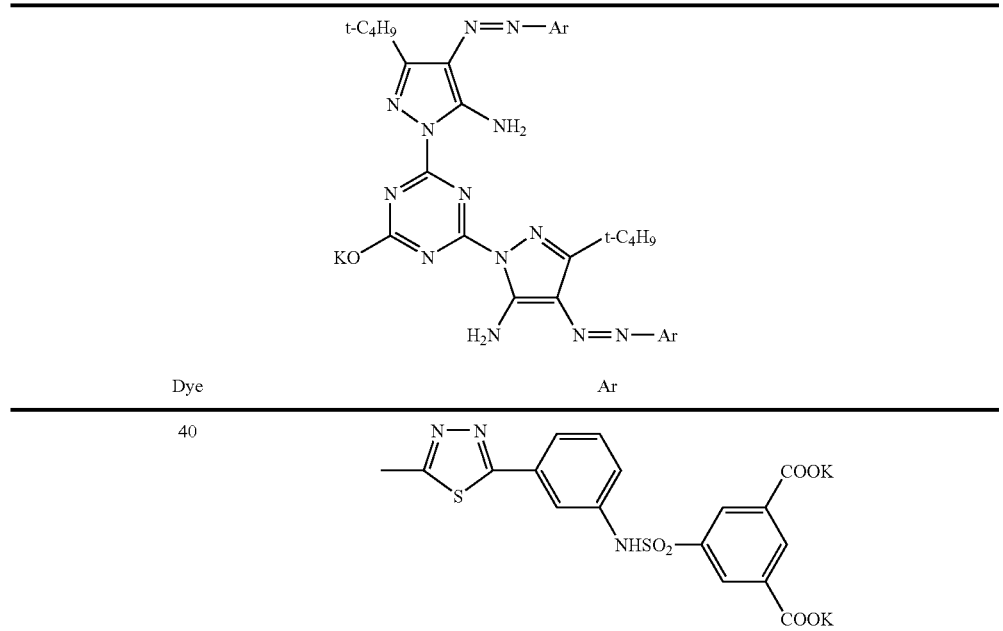
| Dye | Ar |
|---|---|

-continued
41 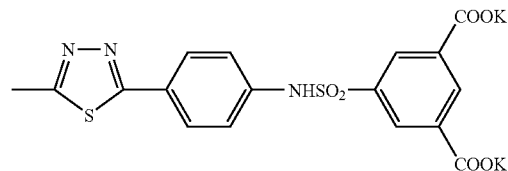
42 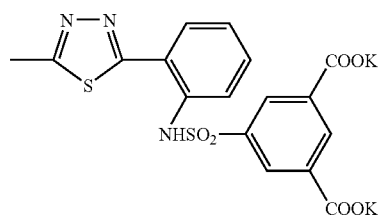
43 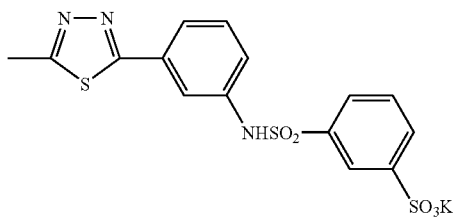
44 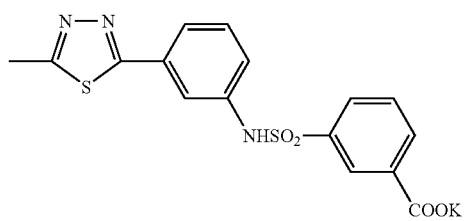
45 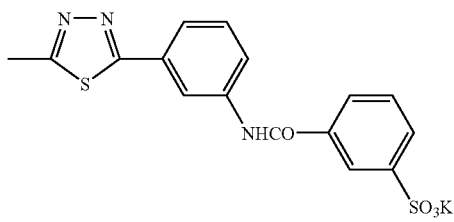
46 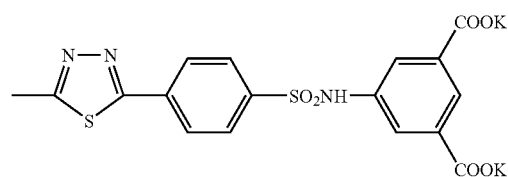
47 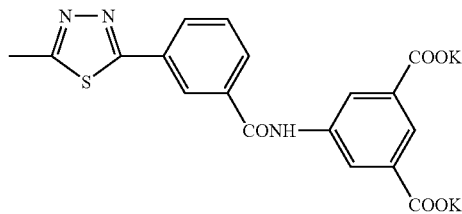

-continued
| | | |
|---|---|---|
| 48 | 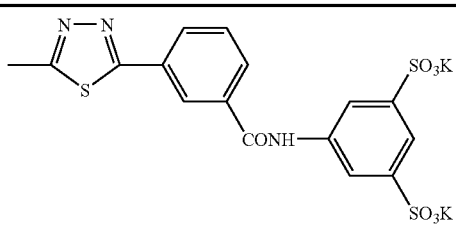 | |
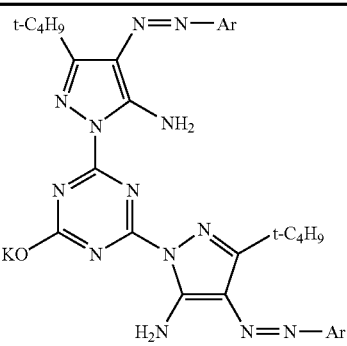
| Dye | Ar |
|---|---|
| 49 | 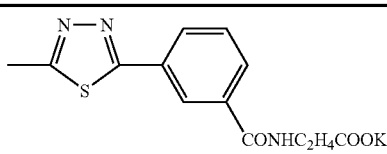 |
| 50 | 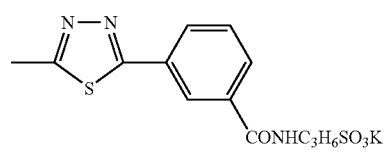 |
| 51 | 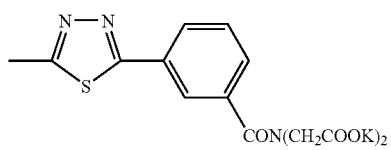 |
| 52 | 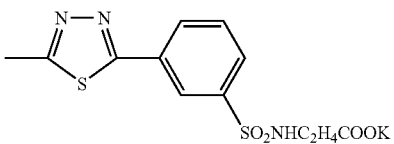 |
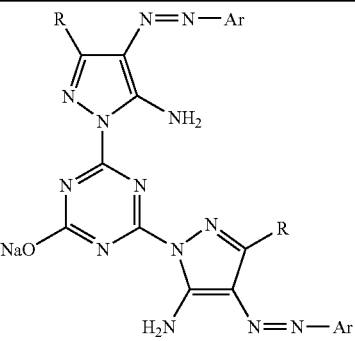
| Dye | R | Ar |
|---|---|---|

-continued

| | | |
|---|---|---|
| 53 | t-C$_4$H$_9$ | (5-methyl-1,3,4-thiadiazol-2-yl)phenyl-NHCO-benzene with COONa, COONa substituents |
| 54 | t-C$_4$H$_9$ | (5-methyl-1,3,4-thiadiazol-2-yl)phenyl-NHCO-benzene with SO$_3$Na |
| 55 | Ph | (5-methyl-1,3,4-thiadiazol-2-yl)-benzene with COONa, COONa |
| 56 | CH$_3$ | (5-methyl-1,3,4-thiadiazol-2-yl)-benzene with SO$_3$Na |
| 57 | t-C$_4$H$_9$ | (5-methyl-1,3,4-thiadiazol-2-yl)-benzene-SO$_3$Na |

Bis-pyrazole triazine dye structure with R and Ar substituents, NaO-triazine core, two pyrazole-NH$_2$ groups with N=N-Ar azo linkages.

| Dye | R | Ar |
|---|---|---|
| 58 | t-C$_4$H$_9$ | 4-cyano-5-methyl-pyrazol-1-yl-phenyl with SO$_3$Na and NaO$_3$S substituents |

-continued
| | | |
|---|---|---|
| 59 | t-C₄H₉ | 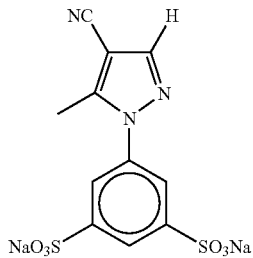 |
| 60 | t-C₄H₉ | 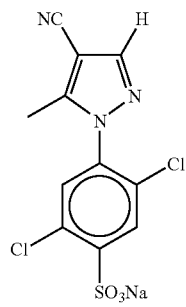 |
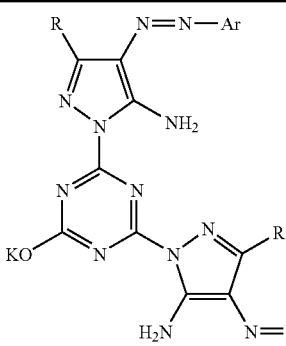
| Dye | R | Ar |
|---|---|---|
| 61 | t-C₄H₉ | 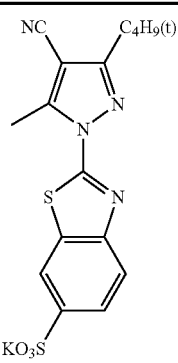 |
| 62 | t-C₄H₉ | 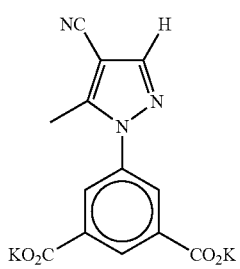 |

| 63 | t-C$_4$H$_9$ | 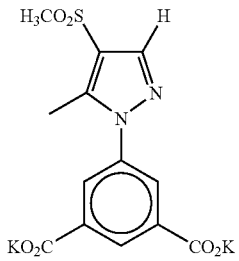 |

As a typical example, a method for synthesizing Dye 1 is described below. Each step in the Synthesis Example can be conducted according to a known method (JP-A-2001-279145, JP-A-2003-277661, JP-A-2003-277662 and JP-A-2004-83903 being able to be referred to).

(Synthesis of Dye 1)

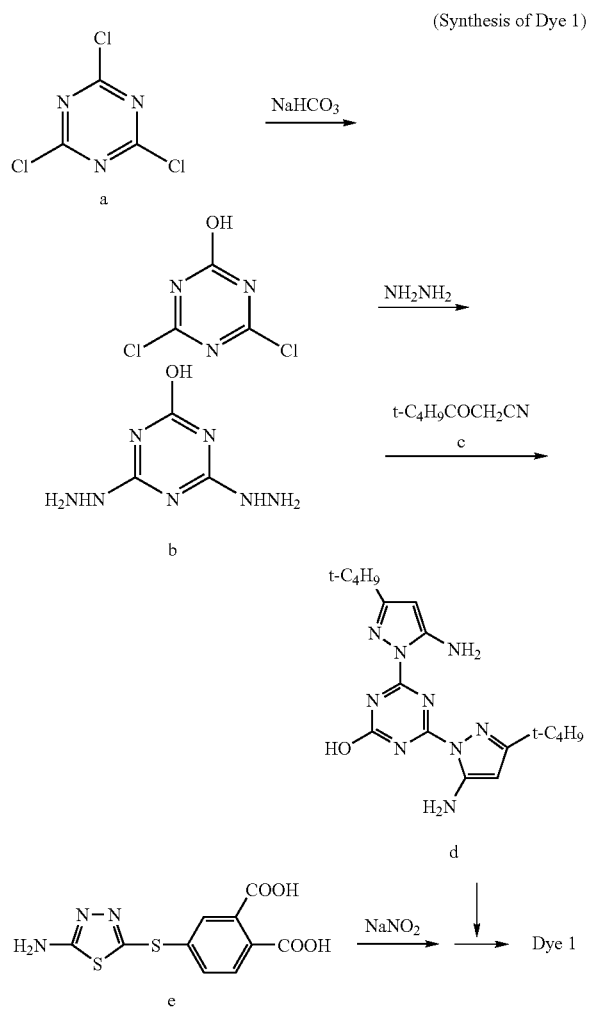

(1) 18.5 g of NaHCO$_3$ and 185 ml of H$_2$O were heated to 40° C., and a solution of 18.4 g of compound a in 48 ml of acetone was added thereto, followed by stirring the resulting mixture for 1 hour. After concentrating acetone, 40 g of hydrazine was added thereto, and the mixture was stirred at room temperature for 3 hours. Crystals precipitated were collected by filtration to obtain 14 g of compound b.

(2) To a mixture of 10.5 g of compound b, 20 g of compound c and 330 ml of H$_2$O was added 10 ml of 1N-NaOH, followed by heating for 3 hours. The reaction mixture was filtered, and the filtrate was rendered acidic with acetic acid. Crystals precipitated were collected by filtration to obtain 4 g of compound d.

(3) 15 g of compound e was diazotized and added to a mixture of 3 g of compound d, 100 ml of MeOH and 16 g of AcOK at 5° C. Crystals precipitated were collected by filtration and subjected to column chromatography using Sephadex to obtain 4.9 g of Dye 1.

$\lambda_{max}$ 451.7 nm (H$_2$O); $\epsilon$: 5.88×10$^4$ (dm$^3$·cm/mol)

Other dyes can be synthesized in the same manner.

(Synthesis of Dye 20)

Synthesis example of Dye 20 is shown below. Dye 20 can be synthesized in the same manner by applying the method of synthesizing Dye 1.

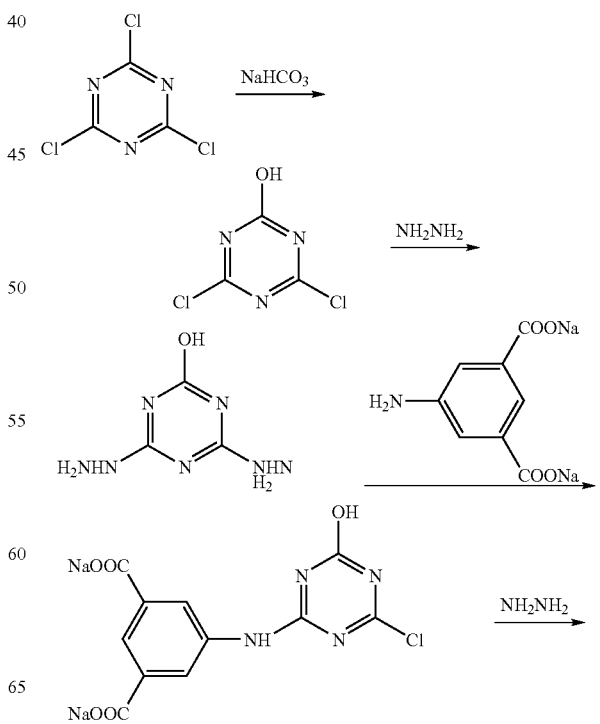

-continued

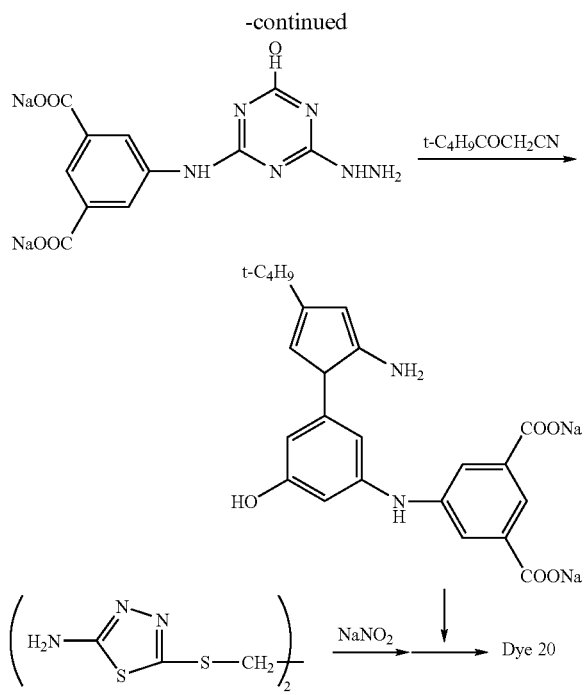

(Synthesis of Dye 40)

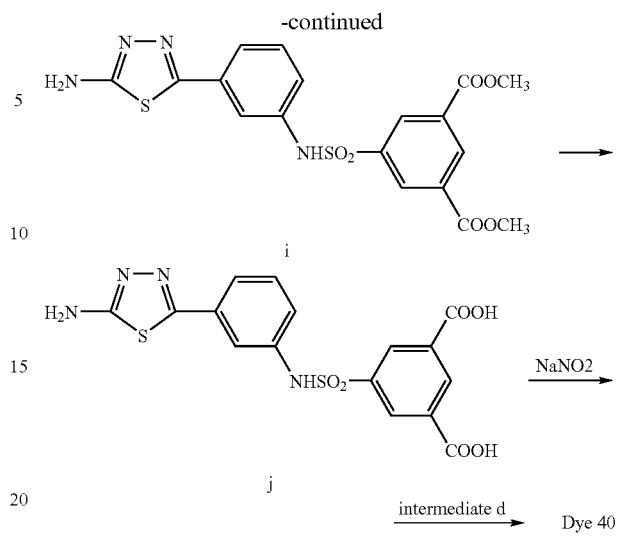

Synthesis of Compound h
22.6 g of compound g was added to a mixture of 9.1 g of compound f and 27 ml of N,N-dimethylacetamide, and reaction was conducted at room temperature for 2 hours, followed by adding methanol thereto. Crystals precipitated were collected by filtration to obtain 23 g of compound h.

Synthesis of Compound i
A mixture of 23 g of compound h, 31 ml of $CF_3COOH$ and 6.2 g of thiourea were stirred at 120° C. for 2 hours, followed by adding thereto $H_2O$ and EtOH. Crystals precipitated were collected by filtration to obtain 14 g of compound i.

Synthesis of Compound j
80 ml of 10% KOH was added to a solution of 14 g of compound i in 150 ml of water, followed by stirring at room temperature for 2 hours. 32 ml of concentrated hydrochloric acid was added thereto, and crystals precipitated were collected by filtration to obtain 14 g of compound j.

Synthesis of Dye 40
5.5 g of compound j was diazotized with 0.9 g of $NaNO_2$, and was added to a mixture of an intermediate d, 10 ml of dimethylformamide and 50 ml of methanol at a temperature of 10° C. or lower than that. Crystals precipitated were collected by filtration, rendered alkaline with 5% KOH and subjected to column chromatography using Sephadex to obtain 3.4 g of Dye 40.
$\lambda_{max}$ 456.8 nm ($H_2O$); $\epsilon$: $6.10 \times 10^4$ ($dm^3 \cdot cm/mol$)

(Synthesis of Dye 62)

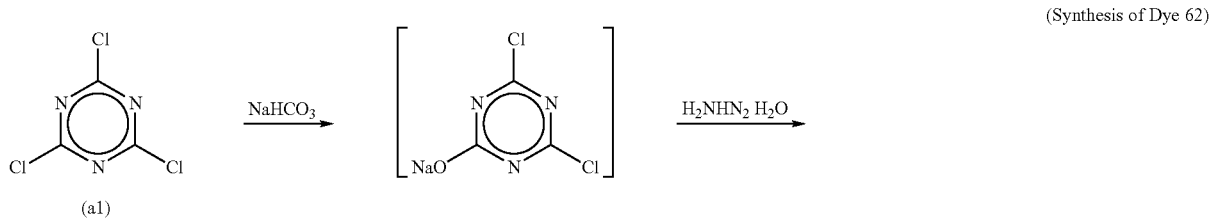

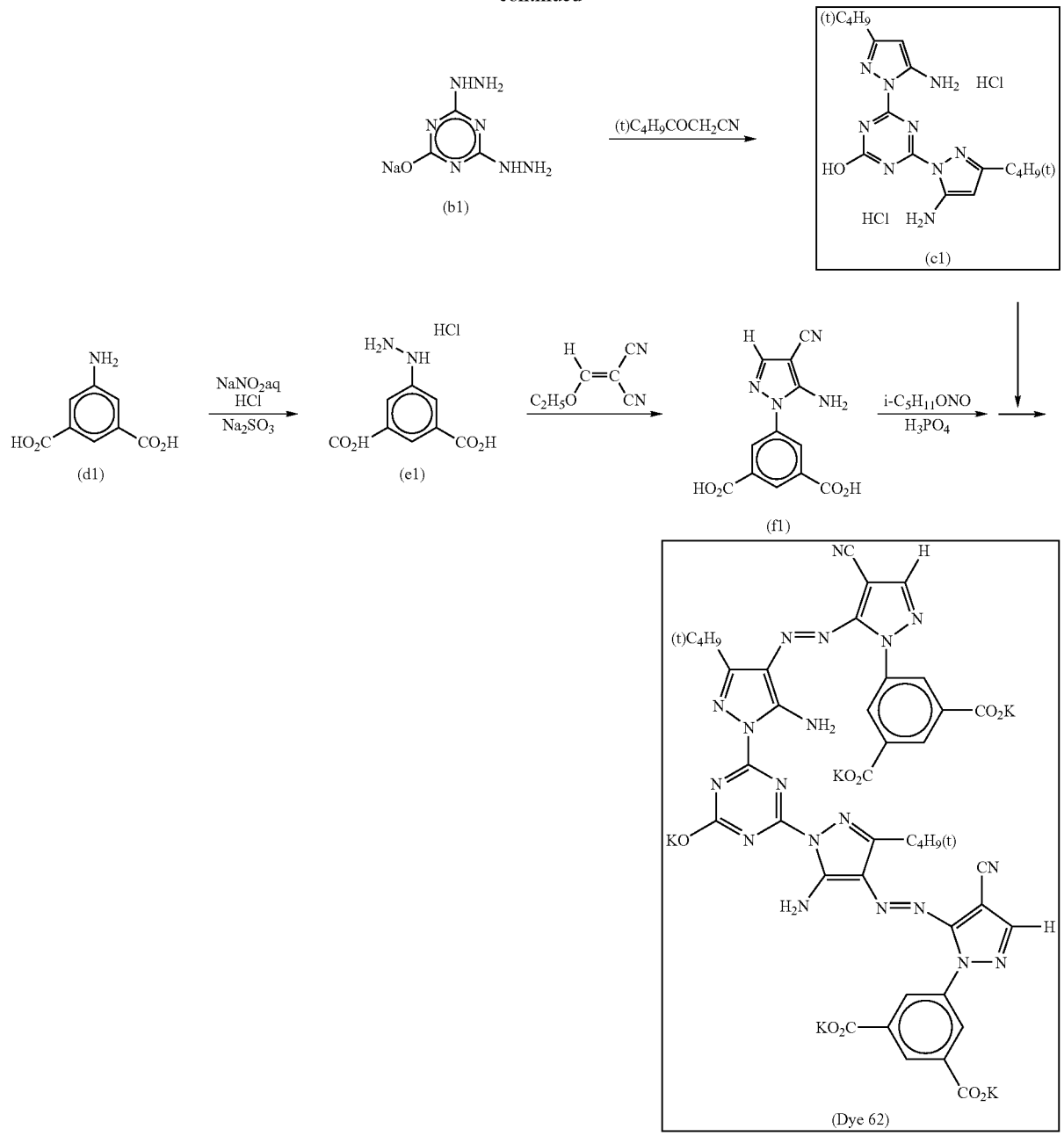

Synthesis of Compound b1

18.5 g of $NaHCO_3$ and 185 ml of $H_2O$ were heated to 40° C., and a solution of 18.4 g of compound a1 (product of Tokyo Kasei) in 48 ml of acetone was added thereto, followed by stirring the resulting mixture for 1 hour. After concentrating acetone, 40 g of hydrazine was added thereto, and the mixture was stirred at room temperature for 3 hours. Crystals precipitated were collected by filtration to obtain 14 g of compound b1 (m.p.>300° C.).

Syntiesis of Compound c1

To a mixture of 10.5 g of compound b1, 20 g of pivaloylacetonitrile (product of Tokyo Kasei) and 330 ml of $H_2O$ was added 10 ml of 1N-NaOH, followed by heating for 3 hours. The reaction mixture was filtered, and the filtrate was rendered acidic with acetic acid. Crystals precipitated were collected by filtration to obtain 4 g of compound c1 (m.p.=233 to 235° C.). $^1$H-NMR (DMSO-$d_6$),σ value (TMS standard):1.2-1.3 (18H, s)

Synthesis of Compound e1

90.57 g of compound d1 was suspended in 500 ml of $H_2O$ and, after adding thereto 130 ml of concentrated hydrochloric acid, the mixture was cooled till the inside temperature reached 5° C. or lower than that. Subsequently, a solution of 36.23 g of sodium nitrite in 70 ml of water was dropwise added thereto within the inside temperature of from 4 to 6° C., followed by stirring for 30 minutes at the inside temperature of 35° C. or lower than that. Then, a mixture of 159 g of sodium sulfite and 636 ml of H₂O were added thereto with keeping the inside temperature at 20° C. or lower than that and, further, 250 ml of concentrated hydrochloric acid was added thereto at the inside temperature of 25° C. Subsequently, the mixture was stirred for 1 hour at the inside temperature of 90° C. and, after cooling the mixture to room temperature in terms of the inside temperature, the product was washed with 200 ml of water and air dried to obtain 80.0 g of compound e1.

Synthesis of Compound f1

28 ml of triethylamine was dropwise added to a suspension of 23.3 g of compound e1 in 209 ml of ethanol, and then 12.2 g of ethoxymethylenemalononitrile (product of ALDRICH) was added thereto by portions, followed by refluxing for 3 hours. After cooling, the product was filtered, washed with 400 ml of isopropyl alcohol, and dried to obtain 23.57 g of compound f1.

Synthesis of Dye 62

5.4 g of compound f1 was dissolved in 43 ml of phosphoric acid at room temperature and, while stirring at an inside temperature of 0° C., 3 ml of isoamyl nitrite (product of Tokyo Kasei) was dropwise adde thereto and, after stirring for 10 minutes at the same temperature, dropwise added to a suspension of 3 g of compound c1 in 100 ml of methanol at an inside temperature of −3 to 5° C. After stirring at the same temperature for 20 minutes, the reaction solution was poured into 500 ml of H₂O and, after stirring at room temperature for 10 minutes, crystals precipitated were collected by filtration, washed with H₂O and air dried to obtain 5.5 g of crude crystals of Dye 62. After preparing a 10 wt % aqueous solution of the thus-obtained crude crystals (at 25° C.; PH: about 8.3.adjusted with a KOH aqueous solution), it was purified through gel column chromatography (H₂O; Sephadex LH-20; Amersham Biosciences) to obtain 2.8 g of Dye 62.

$\lambda_{max}$ 436 nm (H₂O); ε: 3.38×10⁴ (dm³·cm/mol)

The other dyes can be synthesized in the same manner.

The aromatic compound, aliphatic compound and/or the salt thereof, which have at least one of carboxyl group, sulfo group and phosphoric acid group, is described below. In the invention, these compounds are generically referred to as "acid group-containing compound".

In the invention, the term "aromatic compound" as used herein means an aromatic compound having either a hetero ring or a hydrocarbon ring.

The aromatic compound and the aliphatic compound are preferably represented by formula (AC1):

Z-(X)n wherein Z represents an aromatic group or an aliphatic group, X independently represents a member selected from among a carboxyl group (—COOH), a sulfo group (—SO₃H) and a phosphoric acid group (—OP(O)(OH)₂), which may form a salt form, and n represents an integer of from 1 to 6, preferably from 1 to 4. When n represents 2 or more, plural Xs may be the same or different from each other. The counter cation for the salt is not particularly limited, and examples thereof include an alkali metal, ammonium and an organic cation (e.g., tetramethylammonium, guanidium or pyridinium). Of these, an alkali metal and ammonium are preferred, and lithium, potassium, sodium and ammonium are more preferred, with lithium and ammonium being most preferred.

The aromatic group represented by Z may be a group wherein a plurality of aromatic groups are linked to each other through a linking group, and these aromatic rings may further have an aromatic group and/or an aliphatic group as a substituent. The aliphatic group represented by Z may be a group wherein a plurality of aliphatic groups are linked to each other through a linking group, and the aliphatic moiety thereof may further have an aliphatic group as a substituent.

The aromatic group may be a monocyclic aromatic group or a polycyclic aromatic group, and preferred examples thereof include a phenyl group, a pyridyl group, a pyridonyl group, a thiophenyl group and a furanyl group, which may have a substituent.

Preferred examples of the polycyclic aromatic group include a naphthyl group, a quinolyl group, an indolinyl group, a benzothienyl group and a benzofuranyl group, which may have a substituent.

Examples of the linking group include —O—, —S—, —NH—, —CO—, —CH₂—, —CH(CH₃)—, —CH═CH— and a group wherein a plurality of these are combined.

Examples of the substituent for the aromatic group and the aliphatic group are the same as the aforesaid substituents for the aryl group. As the position at which X is bound, X may be bound to the aromatic group or the aliphatic group directly or to the substituent.

Specific examples of the compound represented by formula (AC1) are described below. Examples of the aliphatic group-containing compound include acetic acid, propionic acid, butyric acid, isobutyric acid, n-valeric acid, lauric acid (dodecanoic acid), hexahydrobenzoic acid (cyclohexanecarboxylic acid); oxalic acid, malonic acid, succinic acid, glutaric acid, adipic acid, pimelic acid, azelaic acid, 1,2,3,4-butanetetracarboxylic acid, ethylenediaminetetraacetic acid; maleic acid, fumaric acid, citraconic acid; ascorbic acid, and citric acid. Examples of the aromatic group-containing compound include pyromellitic acid, trimesic acid, trimellitic acid, sulfophthalic acid, phthalic acid, terephthalic acid, p-mercaptobenzoic acid, thiosalicylic acid, sulfosalicylic acid,

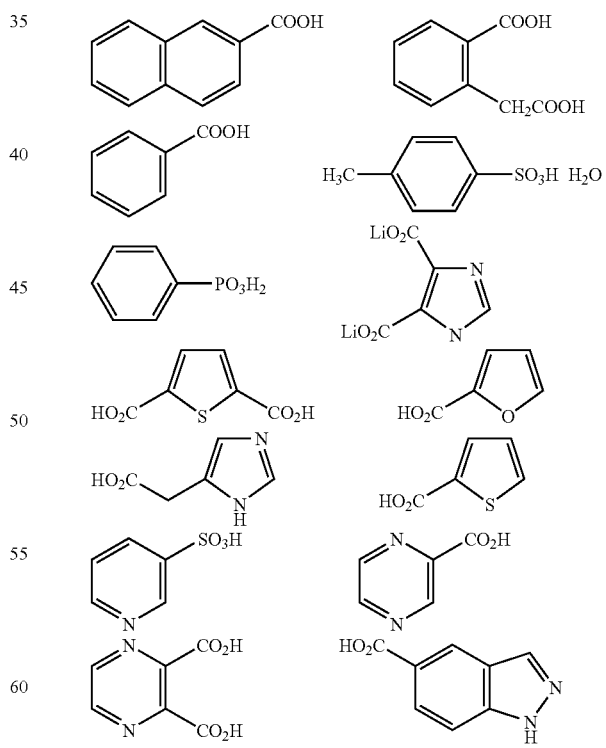

picolinic acid (pyridine-2-carboxylic acid), nicotinic acid (pyridine-3-carboxylic acid), isonicotinic acid (pyridine-4-carboxylic acid), quinolinic acid, lutidinic acid, isocinchomeronic acid and dipicolinic acid. Further, colorless, water-soluble, plane compounds having more than 10 non-localized π electrons per molecule which are described in JP-A-2003-307823 can be used as well.

Of the above-described acid group-containing compound, aromatic compounds (and/or salts thereof) are preferred. Further, aromatic compounds having at least one hetero atom in the ring structure are more preferred. As the hetero atom, nitrogen atom is more preferred. Of the carboxyl group, sulfo group and phosphoric acid group, the carboxyl group is more preferred. These compounds are preferably substantially colorless. The term "substantially colorless" as used herein means that an absorption peak on the longer wavelength side exists at a wavelength ($\lambda_{max}$) of 350 nm or less and the molar extinction coefficient is 10,000 or less. Specifically, picolinic acid (pyridine-2-carboxylic acid), pyridine-3-carboxylic acid and pyridine-4-carboxylic acid are preferred, with pyridine-2-carboxylic acid being particularly preferred.

The acid group-containing compound is contained in the ink composition in a content (total amount of acid-group-containing compounds) of preferably from 0.01 to 60% by weight, more preferably from 0.05 to 10% by weight, still more preferably from 0.1 to 6% by weight.

(Ink Composition)

A preferred ink composition of the invention (hereinafter "ink composition" being in some cases abbreviated as "ink") is an ink containing at least one dye represented by formula (1).

The ink of the invention permits incorporation of a medium. In the case where a solvent is used as a medium, the ink is particularly suited as an ink for use in inkjet recording. The ink of the invention can abe prepared by using as a medium an oloeophilic medium or an aqueous medium and dissolving and/or dispersing therein the dye of the invention. Preferably, an aqueous medium is used.

In the case of dispersing the dye to be used in the invention in an aqueous medium, it is preferred to disperse colored fine particles containing a dye and an oil-soluble polymer in an aqueous medium as described in JP-A-11-286637, JP-A-2001-240763, JP-A-2001-262039 and JP-A-2001-247788 or to disperse the dye of the invention dissolved in a high-boiling organic solvent in an aqueous medium as described in JP-A-2001-262018, JP-A-2001-240763, JP-A-2001-335734 and JP-A-2002-80772. As to specific method for dispersing the dye to be used in the invention in the aqueous medium, oil-soluble polymers to be used, high-boiling organic solvents, additives and the amounts thereof to be used, those which are described in the above-mentioned patent documents can preferably be used. Alternatively, the azo dyes may be dispersed as solid in a state of fine particles. Upon dispersion, a dispersant or a surfactant can be used. As a dispersing apparatus, a simple-structured stirrer, an impeller-stirring system, an in-line stirring system, a mill system (e.g., colloid mill, ball mill, sand mill, attritor, roll mill or agitator mill), an ultrasonic wave system and a high-pressure emulsification system (high-pressure homogenizer; specific commercially available apparatus: Gaulin homogenizer, micro-fluidizer or DeBEE 2000) may be used. As to the method for preparing the ink for inkjet recording, detailed descriptions are given in JP-A-5-148436, JP-A-5-295312, JP-A-7-97541, JP-A-7-82515, JP-A-7-118584, JP-A-11-286637 and JP-A-2001-271003 as well as in the aforesaid patent documents, and can be utilized in preparing the ink of the invention for inkjet recording.

As the aqueous medium, a mixture containing water as a major component and containing, as needed, a water-miscible organic solvent can be used. Examples of the water-miscible organic solvent include alcohols (e.g., methanol, ethanol, propanol, isopropanol, butanol, isobutanol, sec-butanol, t-butanol, pentanol, hexanol, cyclohexanol and benzyl alcohol), polyhydric alcohols (e.g., ethylene glycol, diethylene glycol, triethylene glycol, polyethylene glycol, propylene glycol, dipropylene glycol, polypropylene glycol, butylenes glycol, hexanediol, pentanediol, glycerin, hexanetriol and thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyoleneimine and tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone). Additionally, the water-miscible organic solvents may be used in combination of two or more thereof. The water-miscible organic solvents are materials which function as anti-drying agents for the ink for use in inkjet recording, penetration accelerating agents and wetting agents.

The dye represented by formula (1) to be used in the invention is incorporated in an amount of preferably from 0.1 to 20 parts by weight, more preferably from 0.2 to 10 parts by weight, still more preferably from 0.5 to 9 parts by weight, in 100 parts by weight of the ink of the invention for use in inkjet recording. Also, in the ink of the invention for use in inkjet recording, other dyes may be used in combination with the dye represented by formula (1). In the case of using two or more dyes in combination, the total amount of the dyes is preferably within the above-described scope.

In the ink composition, the acid group-containing compound (the total amount of acid group-containing compounds): the yellow dye by weight is preferably from 0.1:1.0 to 6.0:1.0, more preferably from 0.5:1.0 to 3.0:1.0.

In the ink composition for use in inkjet recording obtained by the invention, additives such as an anti-drying agent (wetting agent) for preventing clogging of a nozzle for jetting the ink due to drying, a penetration accelerating agent for well penetrating the ink into paper, a UV ray absorbent, an anti-oxidant, an anti-foaming agent, a viscosity-adjusting agent, a surface tension-adjusting agent, a dispersing agent, a dispersion-stabilizing agent, an antifungal agent, a rust inhibitor and a pH-adjusting agent may properly be selected and used in a proper amount.

As the anti-drying agent (wetting agent) to be used in the invention, water-soluble organic solvents having a vapor pressure lower than that of water are preferred. Specific examples thereof include polyhydric alcohols represented by ethylene glycol, propylene glycol, diethylene glycol, triethylene glycol, polyethylene glycol, thiodiglycol, dithidiglycol, 2-methyl-1,3-propanediol, 1,2,6-hexanetriol, acetylene glycol derivatives, glycerin and trimethylolpropane; polyhydric alcohol lower alkyl ethers such as ethylene glycol monomethyl (or ethyl) ether, diethylene glycol monomethyl (or ethyl) ether, triethylene glycol monoethyl (or butyl) ether; hetero ring compounds such as 2-pyrrolidone, N-methyl-2-pyrrolidone, 1,3-dimethyl-2-imidazolidinone and N-ethylmorpholine; suslfur-containing compounds such as sulfolane, dimethylsulfoxide and 3-sulfolene; multi-functional compounds such as diacetone alcohol and diethanolamine; and urea derivatives (urea, etc.). Of these, urea, glycerin and triethylene glycol are more preferred. The anti-drying agents may be used independently or in combination of two or more thereof. These anti-drying agents are incorporated in the ink in an amount of from 0.5 to 50% by weight, preferably from 10 to 50% by weight.

As the penetration accelerating agent to be used in the invention, alcohols such as ethanol, isopropanol, butanol, di(tri)ethylene glycol monobutyl ether and 1,2-hexanediol; sodium laurylsulfate and sodium oleate; and nonionic surfactants may be used.

In the invention, glycol ether-based penetration accelerating agents such as diethylene glycol monobutyl ether and triethylene glycol monobutyl ether are preferably used. Incorporation of them in the ink in a content of from 10 to 30% by weight provides sufficient effects, and they are preferably used in an addition amount within the range of not causing blurring of printed letters and print-through troubles.

As UV ray absorbents to be used in the invention for improving preservability of image, there may be used benzotriazole-based compounds described in JP-A-58-185677, JP-A-61-190537, JP-A-2-782, JP-A-5-197075 and JP-A-9-34057; benzophenone-based compounds described in JP-A-46-2784, JP-A-5-194483 and U.S. Pat. No. 3,214,463; cinnamic acid-based compounds described in JP-B-48-30492, JP-B-56-21141 and JP-A-10-88106; triazine-based compounds described in JP-A-4-298503, JP-A-8-53427, JP-A-8-239368, JP-A-10-182621 and JP-T-8-501291 (the term "JP-T" as used herein means a published Japanese translation of a PCT patent application); compounds described in Research Disclosure No.24239; and compounds which absorb UV rays to emit fluorescence, represented by stilbene-based compounds and benzoxazole-based compounds, so-called fluorescent brightening agents.

In the invention, as the antioxidant to be used for improving preservability of image, various organic and metal complex-based anti-fading agents may be used. Examples of the organic anti-fading agents include hydroquinones, alkoxyphenols, dialkoxyphenols, phenols, anilines, amines, indanes, chromans, alkoxyanilines and hetero rings, and examples of metal complexes include nickel complexes and zinc complexes. More specifically, compounds described in patents cited in Research Disclosure, No.17643, VII-I to J, ibid., No.15162, ibid., No.18716, p. 650, left column, ibid., No.36544, p. 527, ibid., No.307105, p. 872 and ibid., No.15162 and compounds included by the general formulae for typical compounds described in JP-A-62-215272, pp. 127-137 can be used.

The anti-foaming agents to be used in the invention are copolymers between dimethylpolysiloxane and polyalkylene oxide and include pendant type, terminal group-modified type and ABN type, with pentant type being preferred. Examples of the copolymer include FZ-2203, -2207, -2222 and -2166 (products of Nippon Unicar Co., Ltd.).

Examples of the antifungal agent to be used in the invention include sodium dehydroacetate, sodium benzoate, sodium pyridinedithione-1-oxide, ethyl p-hydroxybenzoate, 1,2-benzisothiazolin-3-one and the salts thereof. These are used in an amount of preferably from 0.02 to 5.00% by weight.

Additionally, details thereof are described in *Bokin Bobaizai Jiten* (compiled by Nihon Bokin BObai Gakkai Jiten Henshu Iinkai), etc.

Examples of the rust inhibitor include acid sulfites, sodium thiosulfate, ammonium thioglycolate, diisopropylammonium nitrite, pentaerythritol tetranitrate, dicyclohexylammonium nitrite and benzotriazole. These are used in a content of preferably from 0.02 to 5.00% by weight in the ink.

The pH-adjusting agent to be used in the invention can preferably be used for adjusting pH or for imparting dispersion stability, and the pH of the ink at 23° C. is adjusted to 8 to 11, preferably to 7 to 9. In the case where the pH is less than 8, solubility of the dye is so reduced that the nozzle is liable to be clogged whereas, in the case where the pH exceeds 11, water resistance tends to be deteriorated. As the pH-adjusting agent, there are illustrated basic materials such as organic bases and inorganic alkalis and acidic materials such as organic acids and inorganic acids.

Examples of the organic base include triethanolamine, diethanolamine, N-methyldiethanolamine and dimethylethanolamine. Examples of the inorganic alkali include hydroxides of an alkali metal (e.g., sodium hydroxide, lithium hydroxide and potassium hydroxide), carbonates (e.g., sodium carbonate and sodium hydrogen carbonate), and ammonium. Examples of the organic acid include acetic acid, propionic acid, trifluoroacetic acid and alkylsulfonic acid. Examples of the inorganic acid include hydrochloric acid, sulfuric acid and phosphoric acid. As the pH-adjusting agent, triethanolamine is particularly preferably used.

The surface tension-adjusting agent to be used in the invention includes nonionic, cationic and anionic surfactants. Examples of the anionic surfactant include fatty acid salts, alkylsulfates, alkylbenzenesulfonates, alkylnaphthalenesulfonates, dialkylsulfosuccinates, alkylphosphates, naphthalenesulfonic acid-formalin condensate and polyoxyethylene alkylsulfates, examples of the nonionic surfactants include polyoxyethylene alkyl ether, polyoxyethylene alkylaryl ether, polyoxyethylene fatty acid ester, sorbitan fatty acid ester, polyoxyethylenesorbitan fatty acid ester, polyoxyethylene alkylamine, glycerin fatty acid ester, and oxyethylene-oxypropylene block copolymer.

In the invention, acetylene glycol-based surfactants (preferably acetylenic polyoxyethylene oxide) are preferably used, and examples thereof include SURFYNOLS (SURFYNOL 465, etc.; manufactured by Air Products & Chemicals Co.). The content of the surfactant based on the whole weight of the ink composition is from 0.001 to 15% by weight, preferably from 0.005 to 10% by weight, more preferably from 0.01 to 5% by weight, particularly preferably from 0.1 to 5% by weight.

The surface tension of the ink to be used in the invention at 25° C. is preferably from 20 to 50 mN/m or less, more preferably from 20 to 40 mN/m or less, with respect to both dynamic surface tension and static surface tension. In case where the surface tension exceeds 50 mN/m, there results seriously deteriorated ejection stability and printing quality such as blurring upon color mixing and misting. On the other hand, in case where the surface tension of the ink is less than 20 mN/m, there can result printing failure due to deposition of the ink to the surface of a printing stock upon ejection.

The viscosity of the ink of the invention at 25° C. is preferably from 1 to 30 mPa·s, more preferably from 2 to 15 mpa·s, particularly preferably from 2 to 10 mpa·s. In case where it exceeds 30 mPa·s, there result a slow fixing rate of a recorded image and deterioration of ejection performance. On the other hand, in case where it is less than 1 mpa·s, there results blurring of recorded image, leading to deterioration of quality.

Adjustment of the viscosity can freely be conducted by controlling the addition amount of the ink solvent. Examples of the ink solvent include glycerin, diethylene glycol, triethanolamine, 2-pyrrolidone, diethylene glycol monobutyl ether and triethylene glycol monobutyl ether. Also, a viscosity-adjusting agent may be used. Examples of the viscosity-adjusting agent include water-soluble polymers such as celluloses and polyvinyl alcohol and nonionic surfactants. More detailed descriptions are given in *Nendo Chosei Gijutsu* (published by Gijutsu Joho Kyokai in 1999), chapter 9 and *Inku Jetto Purinta Yo Kemikaruzu* (enlarged in 1998)-*Zairyo No Kaihatsu Doko•Tenbo Chosa*-(published by CMC in 1997), pp. 162-174.

The ink to be used in the invention is preferably used for forming a full-color image as well as a mono-color image. In order to form a full-color image, a magenta ink, a cyan ink and a yellow ink can be used. Also, in order to adjust color tone, a black ink may further be used.

Further, in the recording method of the invention (preferably inkjet recording method), other yellow dyes can be used together with the dye of the invention represented by formula (1) within a range wherein the effects of the invention are obtained. Yellow dyes to be used include aryl or heteryl azo dyes having, as a coupling component (hereinafter referred to as "coupler component"), a phenol, an aniline or a hetero ring such as pyrazolone or pyridine or an open-chain type active methylene compound; azomethine dyes having, for example, an open-chain type active methylene compound as a coupler component; methane dyes such as a benzylidene dye and a monomethine oxonol dye; and quinone-based dyes such as a naphthoquinone dye and an anthraquinone dye. Other dyes than these can be selected from among quinophthalone dyes, nitro-nitroso dyes, acridine dyes and acridinone dyes.

Examples of the magenta dye which can be used within a range wherein the effects of the recording method of the invention can be obtained include aryl or heteryl azo dyes having, for example, a phenol, a naphthol or an aniline as a coupler component; azomethine dyes having, for example, a pyrazolone or a pyrazolotriazole as a coupler component; methane dyes such as an arylidene dye, a styryl dye, a merocyanine dye, a cyanine dye and an oxonol dye; carbonium dyes such as a diphenylmethane dye, a triphenylmethane dye and a xanthene dye; quinone dyes such as naphthoquinone, anthraquinone and anthrapyridone; and condensed polycyclic dyes such as dioxazine dyes.

Examples of the cyan dye which can be used within a range wherein the effects of the recording method of the invention can be obtained include aryl or heteryl azo dyes having, for example, a phenol, a naphthol or an aniline as a coupler component; azomethine dyes having, for example, a phenol, a naphthol or a pyrrolotriazole as a coupler component; polymethine dyes such as a cyanine dye, an oxonol dye and a merocyanine dye; carbonium dyes such as a diphenylmethane dye, a triphenylmethane dye and a xanthene dye; phthalocyanine dyes; anthraquinone dyes and indigo•thioindigo dyes.

Examples of the applicable black color material include disazo, trisazo and tetrazodyes and, in addition, a dispersion of carbon black.

(Ink Recording Method)

The ink of the invention is recorded on a material to be recorded. In the inkjet recording method which is preferred in the invention, energy is imparted to the aforesaid ink for use in inkjet recording to form an image on a known image-receiving material used as a material on which an image is to be recorded, i.e., plain paper, resin-coated paper, paper for exclusive use for inkjet recording described in, for example, JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, paper commonly used with electrophotography, cloth, glass, metal or ceramic. Additionally, as an inkjet recording method of the invention, the description in JP-A-2003-306623, paragraph numbers 0093 to 0105 can be applied.

Upon formation of an image, a polymer latex compound may also be used for the purpose of imparting luster or water resistance or improving weatherability. As to the stage of imparting the latex compound to an image-receiving material, the latex compound may be imparted before, after or simultaneously with imparting the colorant. Therefore, as to where to add the latex compound, it may be added to an image-receiving paper or an ink or may be used independently as a liquid substance.

Specifically, methods described in JP-A-2002-166638, JP-A-2002-121440, JP-A-2002-154201, JP-A-2002-144696, JP-A-2002-080759, JP-A-2002-187342 and JP-A-2002-172774 can preferably be employed.

Recording paper and recording film to be used for inkjet printing using the ink of the invention are described below. As a support in the recording paper and the recording film, those which comprise chemical pulp such as LBKP or NBKP, mechanical pulp such as GP, PGW, RMP, TMP, CTMP, CMP or CGP or waste paper pulp such as DIP and are manufactured by mixing, as needed, conventionally known additives such as a pigment, binder, sizing agent, fixing agent, cationic agent and paper strength-increasing agent and using various machines such as a Fourdrinier machine or a wire cylinder paper machine can be used. In addition to these supports, any of synthetic paper and plastic film sheet may be used. The thickness of the support is desirably from 10 to 250 µm and the basis weight is desirably from 10 to 250 g/m2. An ink-receptive layer and a back coat layer may be provided directly on the support, or may be provided after size-pressing with starch or polyvinyl alcohol or after providing on the support an anchor coat layer. Further, the support may be subjected to surface-smoothening treatment by means of a calendering apparatus such as a machine calender, TG calender or soft calender. In the invention, paper laminated on both sides with a polyolefin (e.g., polyethyolene, polystyrene, polyethylene terephthalate, polybutene or the copolymer thereof) or plastic film is more preferably used as the support. It is preferred to add a white pigment (e.g., titanium oxide or zinc oxide) or a toning dye (e.g., cobalt blue, ultramarine or neodymium oxide) to the polyolefin.

The ink-receptive layer to be provided on the support contains a pigment or a aqueous binder. As the pigment, a white pigment is preferred, and examples thereof include white inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate; and organic pigments such as styrene-based pigment, acrylic pigment, urea resin and melamine resin. As the white pigment to be incorporated in the ink-receptive layer, porous inorganic pigments are preferred, with synthetic amorphous silica having a large pore area being particularly preferred. The synthetic amorphous silica may be either of silicic acid anhydride obtained by a dry production method and silicic acid hydrate obtained by a wet production method, with the use of silicic acid hydrate being particularly preferred.

The inkjet recording method of the invention is not limited as to the type of inkjet recording, and may be employed for known recording types such as a charge-controlling type of ejecting an ink utilizing static attraction force; a drop-on-demand type (pressure pulse type) of using an inkjet head capable of forming an ink droplet through mechanical deformation of an electrorestrictive strain element and utilizing vibration pressure of a piezoelectric element; a sound inkjet type wherein an electric signal is converted to a sound beam, and the sound beam is directed to an ink to eject an ink utilizing the radiation pressure; and a thermal inkjet type of heating an ink to form a bubble and utilizing the generated pressure. The inkjet recording method includes a method of ejecting many small-volume ink droplets with a low concentration, called photoink; a method of using a plurality of inks having substantially the same hue and different concentration to improve image quality; and a method of using a colorless, transparent ink.

EXAMPLES

The invention will be described in more detail by reference to the following examples, but the invention should not be construed as being limited thereto.

Example 1

Ultrapure water (resistance value: 18 MΩ or more) was added to the following components to make the total 1 liter, followed by stirring for 1 hour under heating at 30 to 40° C. Then, the mixture was filtered through a microfilter of 0.25 μm in average pore size under reduced pressure to prepare a yellow ink solution Y-101.

| (Formulation of yellow ink Y-101) | |
| --- | --- |
| Yellow dye (Dye 1) | 50 g/l |
| Urea | 10 g/l |
| Triethylene glycol | 90 g/l |
| Glycerin | 90 g/l |
| Triethylene glycol monobutyl ether | 90 g/l |
| 2-Pyrrolidone | 20 g/l |
| Triethanolamine | 7 g/l |
| Surfynol 465 (manufactured by Nissin Kagaku) | 10 g/l |
| Proxel XL2 (manufactured by Avecia) | 5 g/l |

Further, a light magenta ink, a magenta ink, a light cyan ink, a cyan ink and a black ink were prepared by changing the kind of dye and the additives. Thus, an ink set 101 containing them in contents given in Table 1 was prepared.

TABLE 1

(Formulation of ink set 101)

| | Light magenta | Magenta | Light cyan | Cyan | Yellow | Black |
| --- | --- | --- | --- | --- | --- | --- |
| Dye (g/l) | M-2 (8.7) | M-2 (32) | C-1 (17) | C-2 (50) | Dye-40 (50) | Bk-1 (60) Bk-2 (15) Dye-40 (10) |
| Urea (g/l) | 20 | 20 | 20 | 20 | 10 | 50 |
| Triethylene glycol (g/l) | 100 | 20 | 50 | 100 | 90 | 20 |
| Glycerin (g/l) | 120 | 100 | 120 | 110 | 90 | 100 |
| Triethylene glycol monobutyl ether (g/l) | 110 | 100 | 100 | 90 | 90 | 80 |
| 2-Pyrrolidone (g/l) | 30 | 10 | 20 | 35 | 20 | 30 |
| 1,2-Hexanediol (g/l) | 30 | 10 | — | 35 | — | 30 |
| Triethanol-amine (g/l) | 7 | 5 | 2 | 5 | 7 | 4 |
| Surfynol 465 (g/l) | 10 | 10 | 10 | 11 | 10 | 10 |
| Proxel (g/l) | 5 | 5 | 3 | 3 | 5 | 3 |

Next, ink sets 102 to 108 were prepared by changing the yellow ink used in ink set 101 to the following yellow inks Y-102 to Y-108.

Y-101: Yellow dye (Dye-40; 50 g/l), Compound of the invention was not added.

Y-102: Yellow dye (Dye-1; 50 g/l), Compound of the invention was not added.

Y-103: Yellow dye (Dye-40; 50 g/l), Compound of the invention (2-naphthoic acid; 30 g/l)

Y-104: Yellow dye (Dye-40; 50 g/l), Compound of the invention (malonic acid; 20 g/l)

Y-105: Yellow dye (Dye-40; 50 g/l),
Compound of the invention (p-toluenesulfonic acid; 25 g/l)

Y-106: Yellow dye (Dye-1; 50 g/l),
Compound of the invention (pyridine-2-carboxylic acid; 20 g/l)

Y-107: Yellow dye (Dye-40; 50 g/l),
Compound of the invention (pyridine-2-carboxylic acid; 20 g/l)

Y-108: Yellow dye (Dye-62; 50 g/l),
Compound of the invention (pyridine-2-carboxylic acid; 20 g/l)

The oxidation potential of the yellow dye (Dye 1, Dye 40, Dye 62) used is a value obtained by using a 1 mmol/l aqueous solution of the dye and employing the aforesaid measuring method. Oxidation potential: Dye 1 (1.33), Dye 40 (1.32), Dye 62 (1.31); spectral absorption maximum (in water): Dye 1 (452 nm), Dye 40 (457 nm), Dye 62 (436 nm).

Additionally, the variation of pH by the addition of the compound of the invention was adjusted to be within a range of from 8 to 8.5 with a base (e.g., KOH) or an acid (e.g., citric acid).

Also, as a comparison type, a yellow ink cartridge of PM-G800 manufactured by EPSON K.K. was used as an ink set 109.

Each of these ink sets was mounted in a cartridge of an inkjet printer PM-G800 manufactured by EPSON, and a photographic paper "Kotaku" manufactured by EPSON and a lustrous paper manufactured by EPSON were used as image-receiving sheets. A yellow mono-color pattern wherein image density is stepwise changed and a green, red or gray image pattern were recorded on each paper using PM-G800. Image quality, ink-ejecting performance and image fastness were evaluated.

(Evaluation Test)

1) Stability of ejecting an ink was evaluated by setting the cartridge in the printer and, after confirming ejection of the ink through all nozzles, printing 20 sheets of A4-size paper, followed by evaluating according to the following standard.

A: No disorder of printed image from the start to the end of printing

B: Output with some disorder in printed image generated.

C: Disorder of printed image was observed from the start to the end of printing.

This experiment was conducted immediately after filling the ink (ejection performance A) and after storing the ink cartridge for 2 weeks under the condition of 40° C. and 80% RH (ejection performance B).

2) As to image preservability of the yellow dye, evaluation was conducted in the following manner by measuring the yellow density of gray image formed by using a gray image pattern.

(1) Light fastness was evaluated by measuring image density Ci using X-rite 310 immediately after printing and, after irradiating the image with a xenon light (100,000 lx) using a weather meter made by Atlas for 10 days, again measuring the image density Cf, and determining the dye-remaining ratio, (Cf/Ci)×100. The dye-remaining ratio was evaluated at three points of 0.7, 1.4 and 1.8 in reflection density. A sample which gave the dye-remaining ratio of 85% or more at all of the three points was ranked A, a sample which gave the dye-remaining ratio of less than 85% at one point was ranked B, a sample which gave the dye-remaining ratio of less than 85% at two points was ranked C, and a sample which gave the dye-remaining ratio of less than 85% at all points was ranked D.

(2) Heat fastness was evaluated by measuring image density before and after storing a sample for 7 days under the condition of 80° C. and 60% RH using X-rite 310 to determine the dye-remaining ratio. The dye-remaining ratio was evaluated at three points of 0.7, 1.4 and 1.8 in reflection density. A sample which gave the dye-remaining ratio of 85% or more at all of the three points was ranked A, a sample which gave the dye-remaining ratio of less than 85% at one point was ranked B, a sample which gave the dye-remaining ratio of less than 85% at two points was ranked C, and a sample which gave the dye-remaining ratio of less than 85% at all points was ranked D.

(3) Resistance to ozone was evaluated by leaving a sample for 10 days in a box wherein the ozone gas concentration was set at 5 ppm, measuring the image density before and after leaving the sample under the ozone gas using a reflection densitometer (X-rite 310TR), and evaluating the resistance to ozone in terms of the dye-remaining ratio. Additionally, the reflection density was measured at three points of 0.7, 1.4 and 1.8. The ozone gas concentration within the box was established by means of an ozone gas monitor (Model: OZG-EM-01) manufactured by APPLICS.

Evaluation was conducted in four ranks. That is, a sample which gave the dye-remaining ratio of 85% or more at all of the three points was ranked A, a sample which gave the dye-remaining ratio of less than 85% at one point was ranked B, a sample which gave the dye-remaining ratio of less than 85% at two points was ranked C, and a sample which gave the dye-remaining ratio of less than 85% at all points was ranked D.

3) Generation of metallic luster was visually evaluated according to the following standard by observing the solid printed area of yellow or red color.
A: Metallic luster was not observed.
B: Metallic luster was observed somewhat.
C: Metallic luster was clearly observed.
The results thus obtained are shown in the following table.

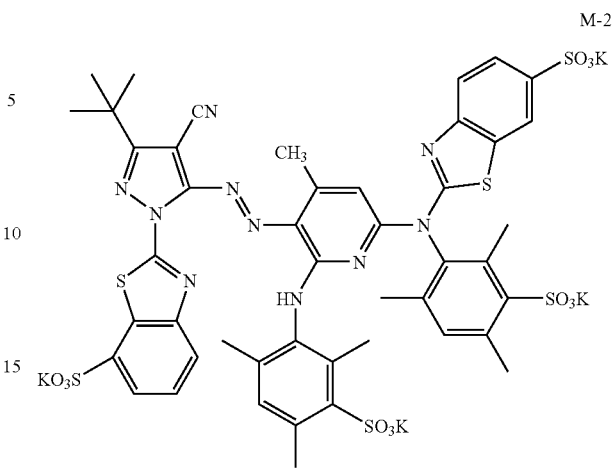

M-2

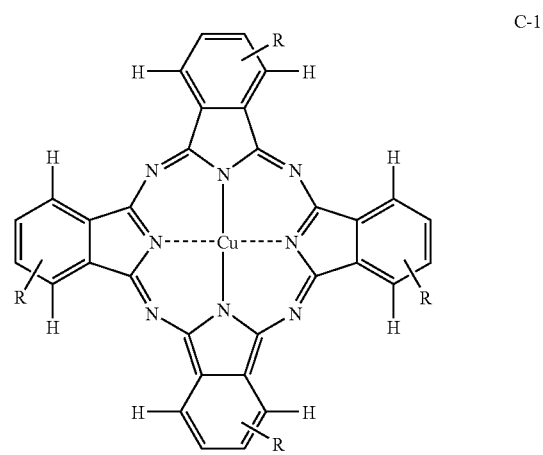

C-1

TABLE 2

| Ink set | Ejection performance A | Ejection performance B | (1) Light | (2) Heat | (3) Ozone | Metallic luster Photographic paper | Metallic luster Lustrous paper | Note |
|---|---|---|---|---|---|---|---|---|
| 101 | A | A | A | A | A | A | C | For comparison |
| 102 | A | A | A | A | B | B | C | For comparison |
| 103 | A | A | A | A | A | A | A | Invention |
| 104 | A | A | A | A | A | A | A | Invention |
| 105 | A | A | A | A | A | A | A | Invention |
| 106 | A | A | A | A | A | A | A | Invention |
| 107 | A | A | A | A | A | A | A | Invention |
| 108 | A | A | A | A | A | A | A | Invention |
| 109 | A | A | B | B | D | A | A | For comparison |

It is seen from the results shown in the table that, in the system using the ink of the invention, excellent ejection performance and excellent weatherability can be obtained, with depressing generation of metallic luster.

Two of R's: $SO_2CH_2CH_2CH_2SO_3Li$
The other two of R's:

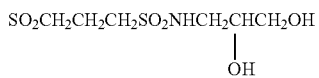

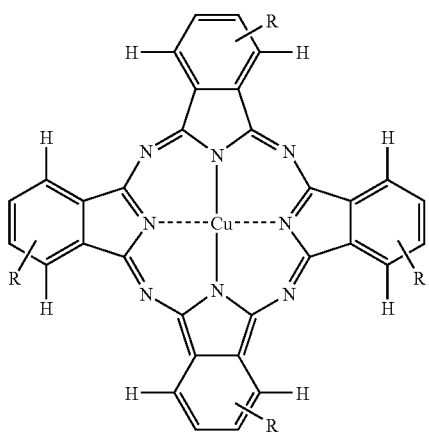

Two of R's: SO$_2$CH$_2$CH$_2$CH$_2$SO$_3$K
The other two of R's: SO$_2$CH$_2$CH$_2$CH$_2$SO$_2$NH(CH$_2$)$_2$O(CH$_2$)$_2$OH

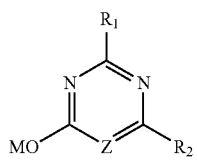

wherein $R_1$ and $R_2$ each independently represents a monovalent group, Z represents a nitrogen atom, an oxygen atom, a sulfur atom or a carbon atom to which a monovalent group is bound, and M represents a hydrogen atom or a cation, provided that two azo groups exist in the molecule; and wherein the at least one compound is at least one of pyridine-2-carboxylic acid, pyridine-3-carboxylic acid, pyridine-4-carboxylic acid and a salt thereof.

2. The ink composition according to claim 1, wherein the at least one compound is at least one of pyridine-2-carboxylic acid and a salt thereof.

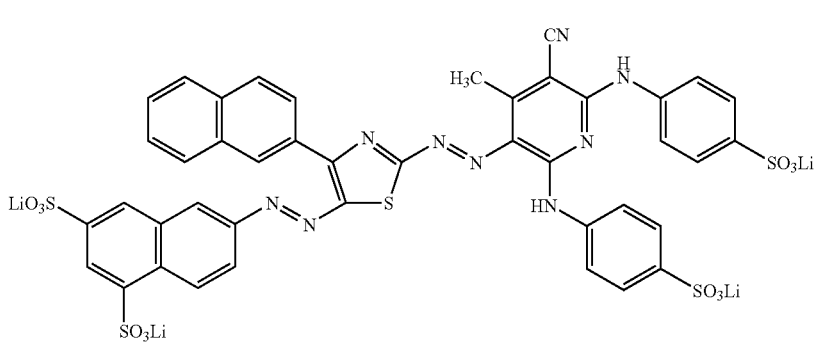

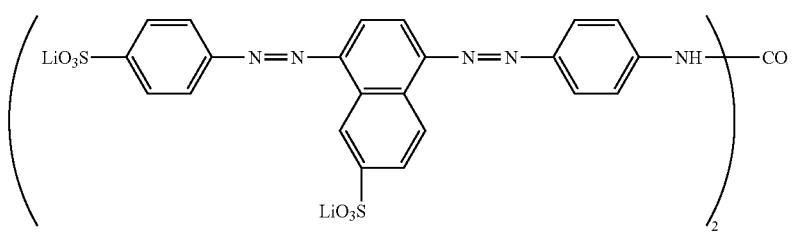

While the invention has been described in detail and with reference to specific embodiments thereof, it will be apparent to one skilled in the art that various changes and modifications can be made therein without departing from the spirit and scope thereof.

The entire disclosure of each and every foreign patent application from which the benefit of foreign priority has been claimed in the present application is incorporated herein by reference, as if fully set forth herein.

What is claimed is:

1. An ink composition comprising: water; a yellow dye having an oxidation potential nobler than 1.0 V; and at least one compound of an aromatic compound and a salt thereof, the at least one compound having at least one of a carboxyl group, a sulfo group and a phosphoric acid group and wherein the yellow dye is a compound represented by formula (1):

3. The ink composition according to claim 1, wherein the monovalent group is a halogen atom, an alkyl group, a cycloalkyl group, an aralky group, an alkenyl group, an alkynyl group, an aryl group, a hetero ring group, a cyano group, a hydroxyl group, a nitro group, a carboxyl group, an alkoxy group, an aryloxy group, a silyloxy group, a hetero ring oxy group, an acyloxy group, a carbamoyloxy group, an alkoxycarbonyloxy group, an aryloxycarbonyloxy group, an amino group, an acylamino group, an aminocarbonylamino group, an alkocycambonylamino group, an aryloxycarbonylamino group, a sulfamoylamino group, an alkylsulfonylamino group, an arylsulfonylamino group, a mercapto group, an alkylthio group, an arylthio group, a hetero ring thio group, a sulfamoyl group, a sulfo group, an alkylsulfinyl group, an arylsulfinyl group, an alkylsulfonyl group, arylsulfonyl group, an acyl group, an aryloxycarbonyl group, an alkoxycarbonyl group, a carbamoyl group, an imido group, a phosphino group, a phosphinyl group, a phospinyloxy group, a phosphinylamino group or a silyl group.

4. The ink composition according to claim 1, wherein the compound represented by formula (1) is a compound represented by formula (2):

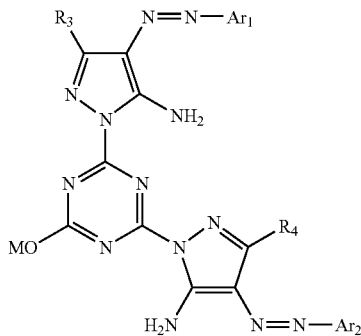

wherein $R_3$ and $R_4$ each independently represents a monovalent group, and $Ar_1$, and $Ar_2$. each independently represents a hetero ring group or an aryl group.

5. The ink composition according to claim 1, wherein the compound represented by formula (1) is a compound represented by formula (3):

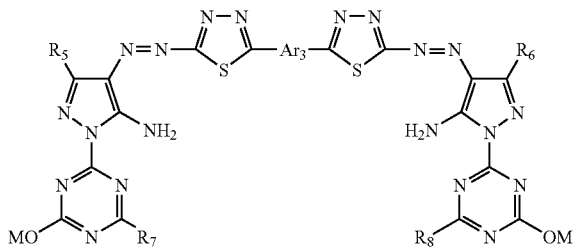

wherein $R_5$, $R_6$, $R_7$ and $R_8$ each independently represents a monovalent group, and $Ar_3$ represents a divalent linking group.

6. The ink composition according to claim 1, wherein the compound represented by formula (1) is a compound represented by formula (4):

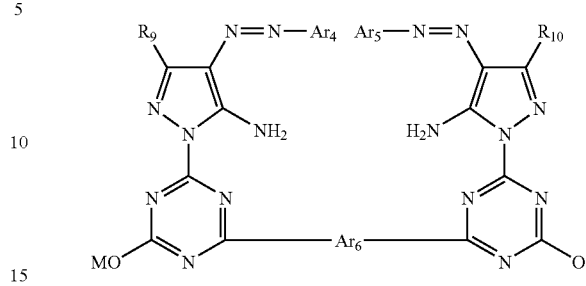

wherein $R_9$ and $R_{10}$ each independently represents a monovajent group, $Ar_4$ and $Ar_5$ each independently represents a hetero ring group or an aryl group, and $Ar_6$ represents a divalent linking group.

7. The ink composition according to claim 1, which has the at least one compound in a content of from 0.1 to 6% by weight based on the total weight of the ink composition.

8. The ink composition according to claim 1, which has a ratio by weight of the at least one compound: the yellow dye of from 0.1:1.0 to 6.0:1.0.

9. The ink composition according to claim 1, which has a pH of from 7 to 9.

10. An ink set comprising an ink composition according to claim 1.

11. An inkjet recording method, comprising ejecting a liquid droplet of an ink composition to deposit the liquid droplet on a recording medium, wherein said ink composition is the ink composition according to claim 1.

12. An inkjet recorded product, which is recorded by employing an inkjet recording method according to claim 11.

13. A method for avoiding bronze phenomenon in inkjet recording, comprising the steps of utilizing an ink composition containing a yellow dye, wherein the composition further comprises an aromatic compound, or an aliphatic compound and/or a salt thereof, wherein the aromatic compound or aliphatic compound comprises a carboxyl group, a sulfo group or a phosphoric acid group.

* * * * *